(12) United States Patent
Kobayashi et al.

(10) Patent No.: US 11,140,275 B2
(45) Date of Patent: Oct. 5, 2021

(54) NON-TRANSITORY COMPUTER-READABLE STORAGE MEDIUM STORING PROGRAM FOR ASSISTING MOVEMENT OF COLORIMETER AND METHOD OF PRODUCING PRINTING SYSTEM

(71) Applicant: SEIKO EPSON CORPORATION, Tokyo (JP)

(72) Inventors: Ayako Kobayashi, Nagano (JP); Haruki Asakura, Nagano (JP); Shiori Naruse, Tokyo (JP); Masayuki Inoue, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 16/553,237

(22) Filed: Aug. 28, 2019

(65) Prior Publication Data

US 2020/0070540 A1 Mar. 5, 2020

(30) Foreign Application Priority Data

Aug. 30, 2018 (JP) .............................. JP2018-162165

(51) Int. Cl.
*H04N 1/60* (2006.01)
*H04N 1/00* (2006.01)
*G01J 3/52* (2006.01)
*G01J 3/50* (2006.01)
*B41J 2/21* (2006.01)

(52) U.S. Cl.
CPC ............ *H04N 1/00015* (2013.01); *G01J 3/50* (2013.01); *G01J 3/52* (2013.01); *H04N 1/00023* (2013.01); *H04N 1/00034* (2013.01); *H04N 1/00045* (2013.01); *H04N 1/00074* (2013.01); *H04N 1/00087* (2013.01); *H04N 1/6044* (2013.01); *B41J 2/2103* (2013.01)

(58) Field of Classification Search
CPC ........... H04N 1/00002; H04N 1/00034; H04N 1/00045; H04N 1/00087; H04N 21/44231; G01J 3/46; G01J 3/52; G06K 7/089; G06K 9/22; G06K 2007/10524
USPC .......................... 358/504, 505, 518, 473, 486
See application file for complete search history.

(56) References Cited

U.S. PATENT DOCUMENTS

| | | | |
|---|---|---|---|
| 7,317,554 B2 | 1/2008 | Ueda et al. | |
| 8,325,393 B2 | 12/2012 | Yamamoto | |
| 8,824,001 B2 | 9/2014 | Doi | |
| 2007/0030525 A1 | 2/2007 | Ono | |
| 2010/0090807 A1* | 4/2010 | Tsujimoto | G06K 7/10039 340/10.4 |
| 2015/0233764 A1* | 8/2015 | Nakatsuka | G01J 3/524 358/1.9 |

FOREIGN PATENT DOCUMENTS

| | | |
|---|---|---|
| JP | 2005-061926 A | 3/2005 |
| JP | 2006-258683 A | 9/2006 |
| JP | 3820979 B2 | 9/2006 |
| JP | 2013-039826 A | 2/2013 |

* cited by examiner

*Primary Examiner* — Jamares Q Washington
(74) *Attorney, Agent, or Firm* — Global IP Counselors, LLP

(57) ABSTRACT

A PC presents, to a user, a difference between an actual speed and an ideal speed, the actual speed being a moving speed of a colorimeter when the user moves the colorimeter with respect to a color chart, the ideal speed being a moving speed of the colorimeter ideal for color measurement on the color chart.

7 Claims, 26 Drawing Sheets

NON-TRANSITORY COMPUTER-READABLE STORAGE MEDIUM STORING PROGRAM FOR ASSISTING MOVEMENT OF COLORIMETER AND METHOD OF PRODUCING PRINTING SYSTEM

The present application is based on, and claims priority from JP Application Serial Number 2018-162165, filed Aug. 30, 2018, the disclosure of which is hereby incorporated by reference herein in its entirety.

BACKGROUND

1. Technical Field

The present disclosure relates to a non-transitory computer-readable storage medium storing a program for assisting an operation of a user to move a colorimeter, and also relates to a method of producing a printing system.

2. Related Art

A colorimeter with which color measurement on a color chart for color measurement is manually performed, for example, one disclosed in JP-A-2005-061926, has been known.

When a user is inexperienced in color measurement, the user may be uncertain about a proper color measurement method and likely fail in color measurement according to related art.

SUMMARY

A non-transitory computer-readable storage medium storing a program for assisting an operation of a user to move a colorimeter with respect to a color chart for color measurement according to an aspect of the disclosure is provided. The program causes a computer to function as a control unit that causes a presenting unit to present information indicating a difference between an actual speed and an ideal speed, the actual speed being a moving speed of the colorimeter when the user moves the colorimeter with respect to the color chart, the ideal speed being a moving speed of the colorimeter ideal for color measurement on the color chart.

A method of producing a printing system according to another aspect of the disclosure is provided. The printing system includes a printing apparatus that prints a color chart sheet including a color chart for color measurement by a colorimeter that is manually moved, and a control device that controls the colorimeter and the printing apparatus. The method includes printing, by the printing apparatus, the color chart sheet; performing, by the colorimeter, color measurement on the color chart of the color chart sheet; causing, by the control device, a presenting unit to present information indicating a difference between an actual speed and an ideal speed, the actual speed being a moving speed of the colorimeter when a user moves the colorimeter with respect to the color chart, the ideal speed being a moving speed of the colorimeter ideal for color measurement on the color chart; and preforming, by the control device, color adjustment based on a result of the color measurement on the color chart by the colorimeter, and producing the printing system.

DESCRIPTION OF EXEMPLARY EMBODIMENTS

First Embodiment

A program and a method of producing a printing system according to an embodiment are described below with reference to the accompanying drawings. In a first embodiment, printing of a color chart sheet 4 (see FIG. 5) including a color chart 41 for color measurement is described.

Figure 1:
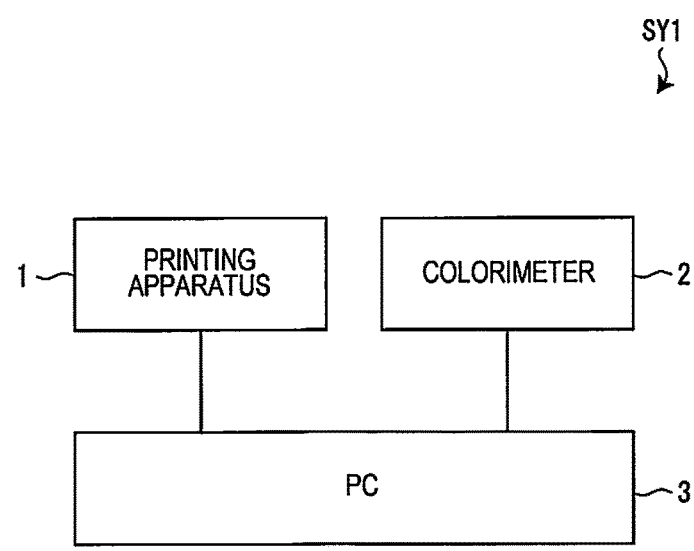
FIG. 1 is a system configuration diagram of a first printing system.

FIG. 1 is a system configuration diagram of a first printing system SY1. The first printing system SY1 includes a printing apparatus 1 that prints the color chart sheet 4, a colorimeter 2 that performs color measurement on the color chart 41 of the color chart sheet 4, and a personal computer (PC) 3 that controls the printing apparatus 1 and the colorimeter 2. The PC 3 is an example of "a control device".

In the first printing system SY1, the printing apparatus 1 is coupled to the PC 3, and the colorimeter 2 is coupled to the PC 3, via a communication line, such as a cable or a network. The communication line may be a wired communication line or a wireless communication line. Alternatively, an information processing terminal such as a smartphone may be used instead of the PC 3.

Figure 2:
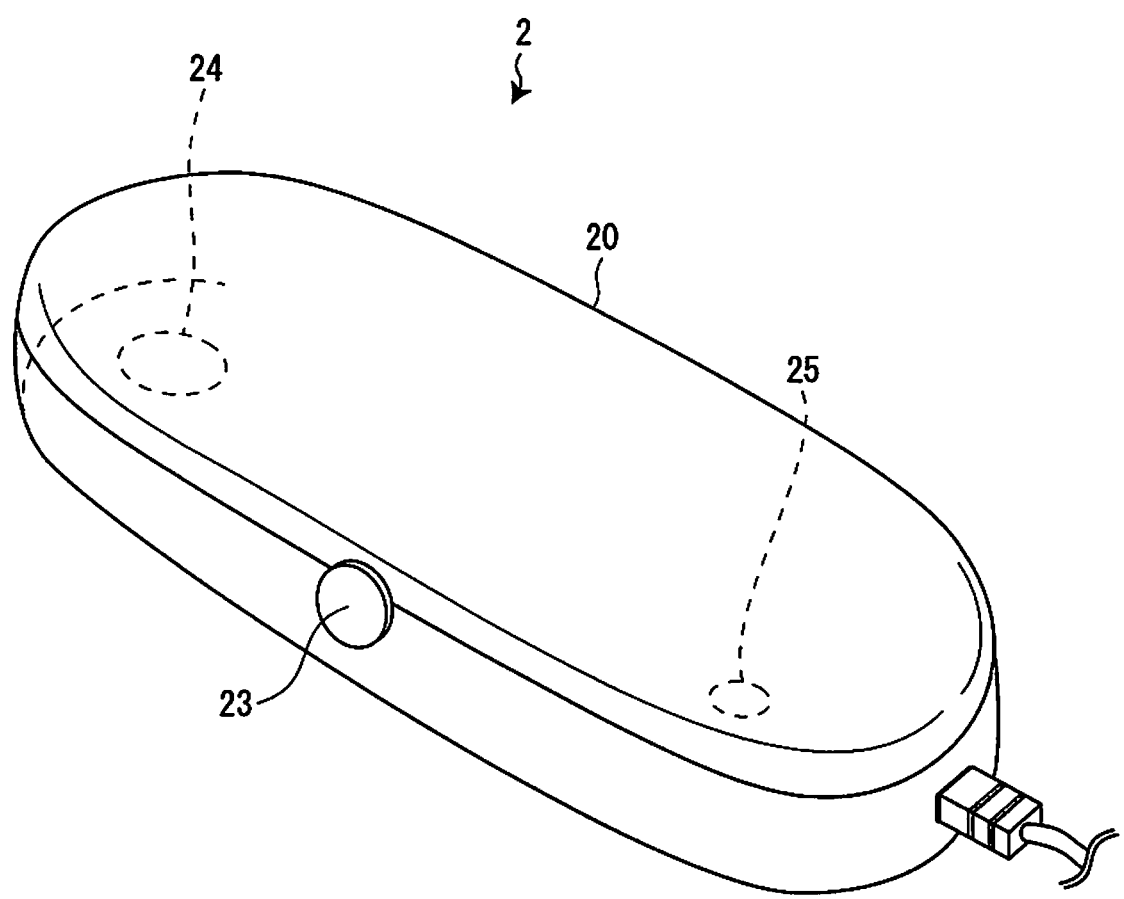
FIG. 2 is a perspective view of a colorimeter.

FIG. 2 is a perspective view of the colorimeter 2. The colorimeter 2 according to this embodiment is a manual movement type that is manually moved by a user. The colorimeter 2 includes a colorimeter body 20, a color measurement button 23, an optical sensor 24, and a sliding protrusion 25. The colorimeter body 20 has a substantially elliptic shape when viewed from above, that is, the side of the user who operates the colorimeter 2, and has a slightly larger width in a portion thereof on a near side, from which the communication line extends, as compared with the width in a portion thereof on a distal end side.

The color measurement button 23 is for the user inputting a start instruction and an end instruction, and is provided at a position operable by the user while the user holds the colorimeter 2, for example, at a side surface of the colorimeter body 20. In this embodiment, the user presses the color measurement button 23 when starting color measurement, keeps pressing the color measurement button 23 during color measurement, and releases the color measurement button 23 when ending color measurement.

The optical sensor 24 and the sliding protrusion 25 are provided at a lower surface of the colorimeter body 20, that is, a surface that comes into contact with the color chart sheet 4. The optical sensor 24 reads the color of each patch included in the color chart 41. The sliding protrusion 25 protrudes downward from the lower surface of the colorimeter body 20, and is a portion that comes into contact with a guide recess 57a of a color measurement guide 57 (see FIG. 3, described later).

Figure 3:
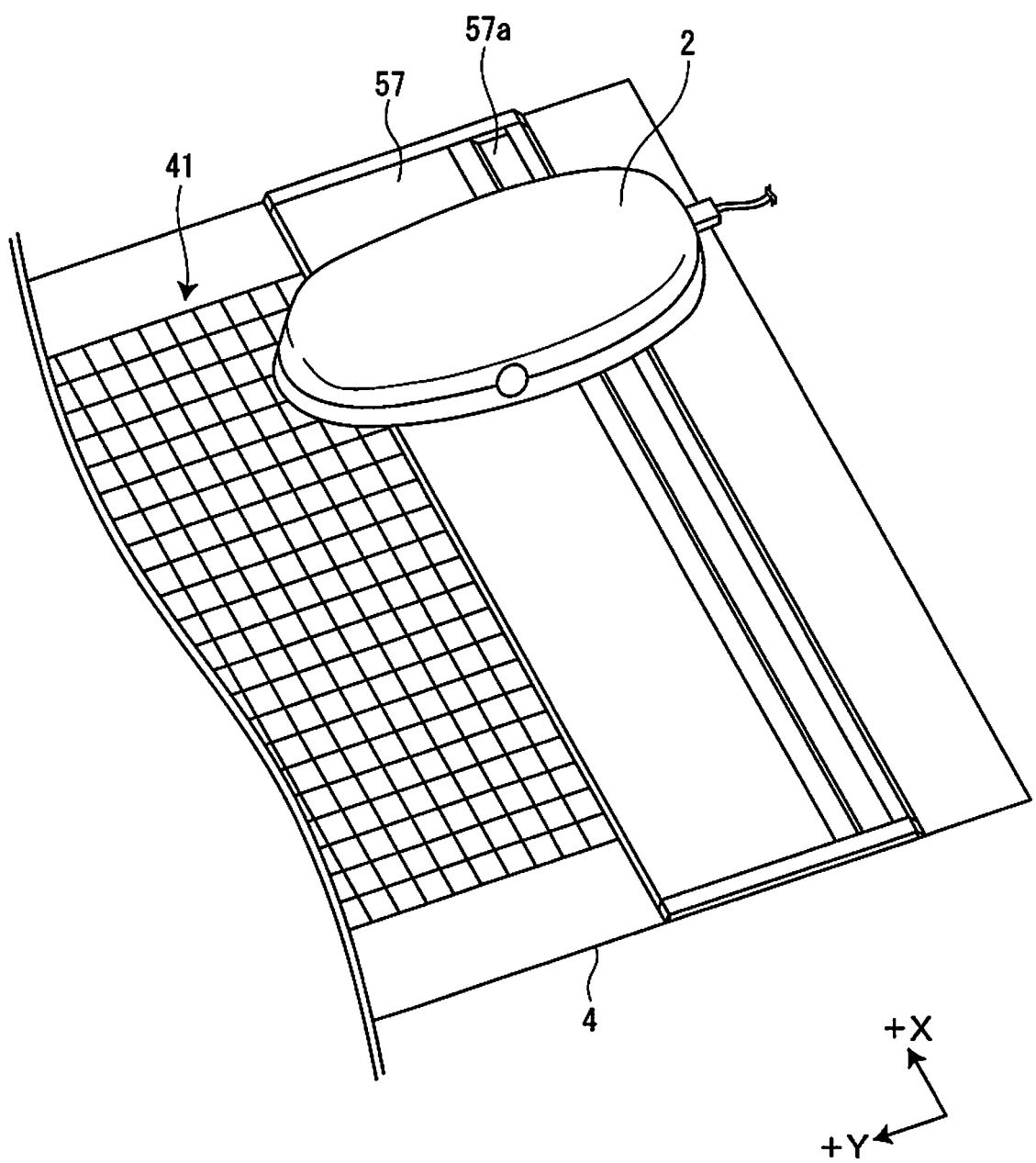
FIG. 3 is a perspective view illustrating the colorimeter, a color measurement guide, and a color chart sheet during color measurement.

FIG. 3 is a perspective view illustrating the colorimeter 2, the color measurement guide 57, and the color chart sheet 4 during color measurement. As illustrated in FIG. 3, the color measurement guide 57 is a substantially rectangular plate-shaped member, and has the guide recess 57a in which the sliding protrusion 25 of the colorimeter 2 slides. The guide recess 57a is linearly formed from the left end to the right end of the color measurement guide 57 along the longitudinal direction of the color measurement guide 57. The color measurement guide 57 is used as a guide for moving the colorimeter 2 in parallel to a line of patches of the color chart 41.

The user reciprocates the colorimeter 2 in the X direction along the color measurement guide 57, and hence performs color measurement on one line of patches. To be more specific, as described below, color measurement is performed on one line of patches by forward color measurement that is color measurement in the +X direction, and return color measurement that is color measurement in the −X direction.

The user presses the color measurement button 23 of the colorimeter 2 before the user starts moving the colorimeter 2, and moves the colorimeter 2 in the +X direction while pressing the color measurement button 23. The user releases the color measurement button 23 after the user ends the movement in the +X direction. Thus, the forward color measurement is performed. Then, the user presses the color measurement button 23 of the colorimeter 2, and moves the colorimeter 2 in the −X direction while pressing the color measurement button 23. The user releases the color measurement button 23 after the user ends the movement in the −X direction. Thus, the return color measurement is performed.

The X direction is an example of "a movement direction of a colorimeter". The direction of the reciprocating movement of the colorimeter 2 may be reversed. That is, forward color measurement may be performed by movement of the colorimeter 2 in the −X direction, and return color measurement may be performed by movement of the colorimeter 2 in the +X direction. When the user ends color measurement for one line of patches, the user moves the color measurement guide 57 by an amount corresponding to one line of patches in a row direction of patches, and performs color measurement on the next line of patches.

Figure 4:
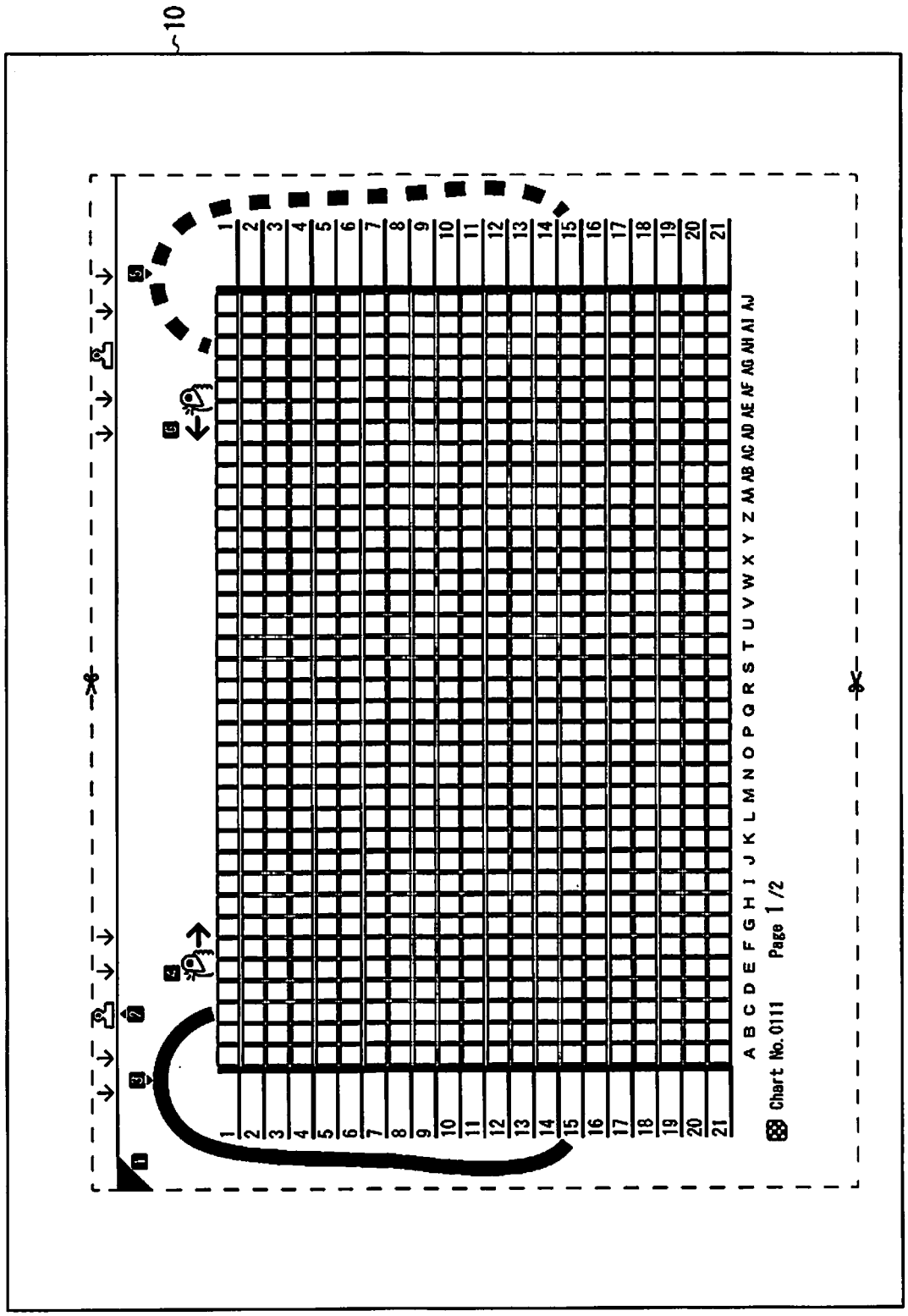
FIG. 4 is a plan view of the color chart sheet.
Figure 5:
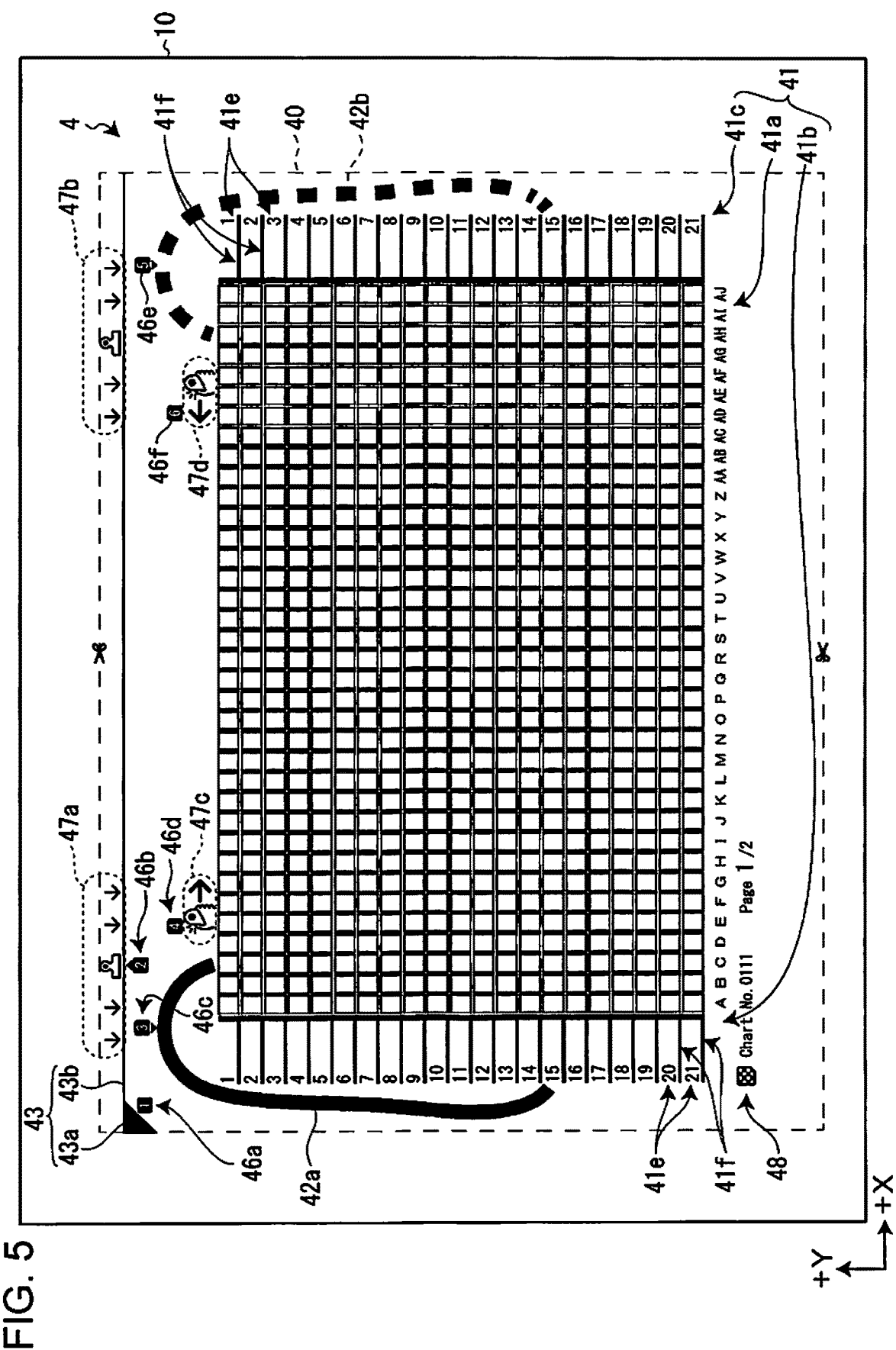
FIG. 5 is a view with reference signs applied to FIG. 4.

FIGS. 4 and 5 each are a plan view of the color chart sheet 4. FIG. 5 is a view with reference signs applied to FIG. 4 for the convenience of explanation. That is, an actual printed matter of the color chart sheet 4 is one illustrated in FIG. 4. The color chart sheet 4 is created by cutting a sheet 10 with a predetermined size, such as A4 size or B5 size. In FIG. 5, a first broken line 40 with marks of scissors serves as a cut position. Alternatively, cutting of the sheet 10 may be omitted by printing the color chart sheet 4 to meet a predetermined sheet size.

The color chart sheet 4 includes the color chart 41. The color chart 41 includes a patch group region 41a, a patch group left region 41b, and a patch group right region 41c. The patch group region 41a has a plurality of patches colored with different colors and arranged in a matrix form. The plurality of patches have rectangular shapes with the same size and are equally spaced apart from one another.

The color measurement on the color chart 41 can be accurately performed by starting and ending color measurement at positions outside the patch group region 41a in both forward color measurement and return color measurement. Hence, for example, in forward color measurement, the color measurement is started from a state in which the optical sensor 24 of the colorimeter 2 is located in the patch group left region 41b, and the color measurement is ended when the colorimeter 2 is moved in the +X direction until the optical sensor 24 of the colorimeter 2 is located in the patch group right region 41c.

The patch group left region 41b and the patch group right region 41c include patch line number images 41e indicating numbers of lines of patches. Regarding the patch line number images 41e, natural numbers from "1" are sequentially assigned to lines of patches from a first line of patches in the −Y direction. In the following description, "a first line of patches" is referred to as "a leading line".

In addition, the patch group left region 41b and the patch group right region 41c include line images 41f indicating the upper end position of the color measurement guide 57. The user arranges the color measurement guide 57 so that the upper end of the color measurement guide 57, that is, the end on the +Y side of the color measurement guide 57 is located above the line image 41f between "1" and "2" of the patch line number images 41e, for example, when color measurement is performed on the leading line. In addition, when the user ends the color measurement on the leading line, the user moves the color measurement guide 57 so that the upper end of the color measurement guide 57 is located above the line image 41f between "2" and "3" of the patch line number images 41e to perform color measurement on the second line of patches.

The color chart sheet 4 includes a first image 42a and a second image 42b. The first image 42a is an image indicating a color measurement start position and a color measurement start direction of the colorimeter 2 in the forward path in the leading line of the color chart 41. The color measurement start position represents a position at which the colorimeter 2 is to be placed when starting color measurement in the X direction of the color chart 41. The color measurement start direction represents a posture of the colorimeter 2 at the color measurement start position, and represents the direction in which the colorimeter 2 faces when the colorimeter 2 starts color measurement, at a sheet surface of the color chart sheet 4, that is, around an axis perpendicular to the XY plane.

The first image 42a is an image indicating a portion of the contour of the colorimeter 2 viewed from the side of the user who operates the colorimeter 2 when the colorimeter 2 is arranged at the color measurement start position of the colorimeter 2 in the forward path in the leading line of the color chart 41. In the example in FIG. 5, the first image 42a is an image using a thick solid line indicating a portion of the contour of the colorimeter 2 from the +Y side to the −X side.

The second image 42b is an image indicating a color measurement start position and a color measurement start direction of the colorimeter 2 in the return path in the leading line of the color chart 41. The second image 42b is an image indicating a portion of the contour of the colorimeter 2 viewed from the side of the user who operates the colorimeter 2 when the colorimeter 2 is arranged at the color measurement start position of the colorimeter 2 in the return path in the leading line of the color chart 41. In the example in FIG. 5, the second image 42b is an image using a thick broken line indicating a portion of the contour of the colorimeter 2 from the +Y side to the +X side. The first image 42a and the second image 42b are not present at positions overlapping the color chart 41.

The first image 42a and the second image 42b are not respectively limited to the thick solid line and the thick broken line, and may be other images or other patterns. Alternatively, the first image 42a and the second image 42b may be images each indicating the entire contour of the colorimeter 2. The first image 42a and the second image 42b do not have to be images in different forms, and may be images in the same form. For example, the first image 42a and the second image 42b both may be images of thick solid lines. The first image 42a and the second image 42b each do not have to be an image only representing the contour, and may include another image, such as an image of the colorimeter 2, inside the contour.

Figure 6:
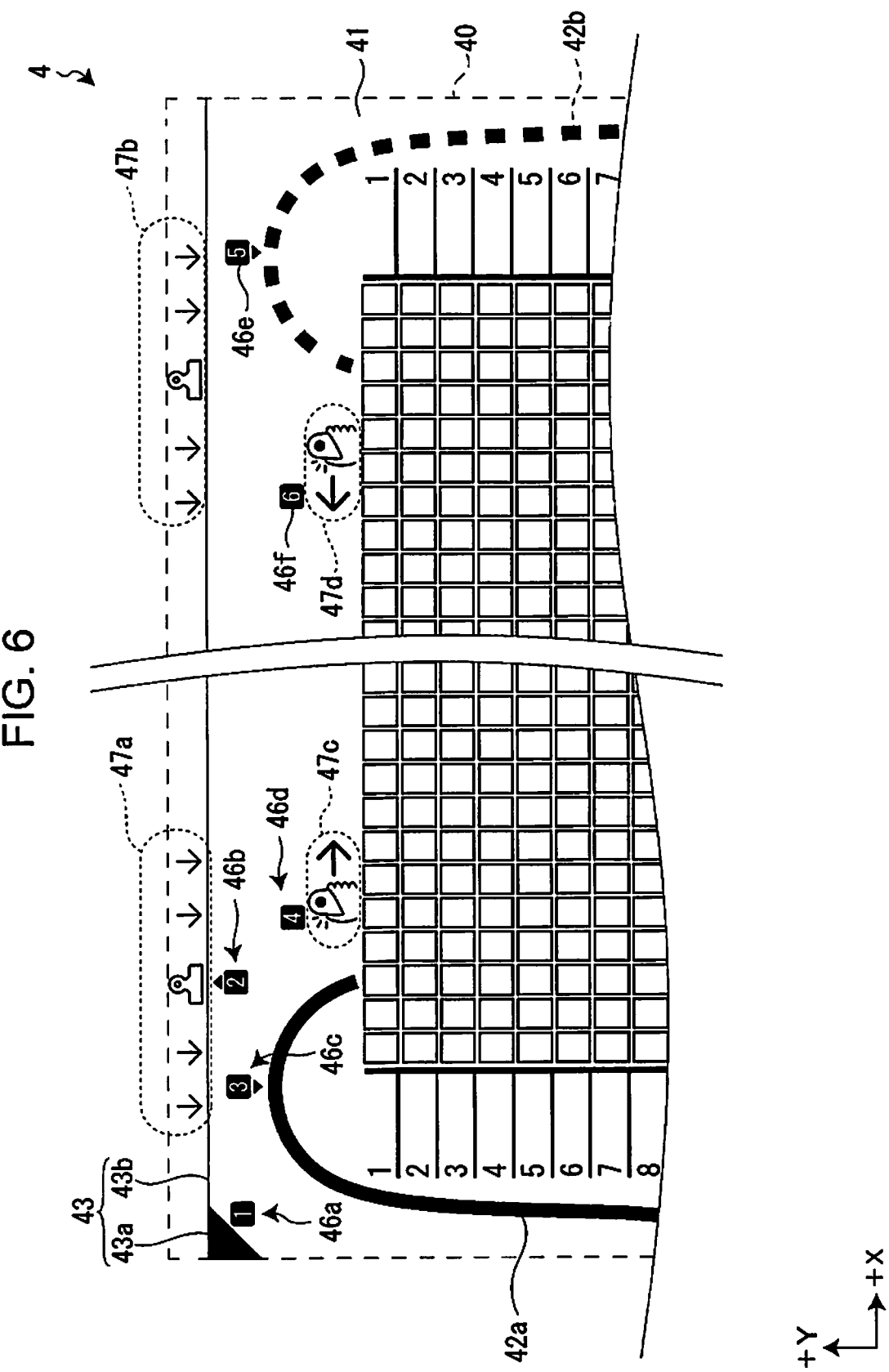
FIG. 6 is an enlarged view of a portion of FIG. 5.

FIG. 6 is an enlarged view of a portion of FIG. 5. As illustrated in FIGS. 5 and 6, the color chart sheet 4 includes third images 43. The third images 43 are images corresponding to predetermined positions of a tray 5 at which the color chart sheet 4 is arranged. Although the details will be described later, a tray body 50 of the tray 5 includes a clip arrangement region 50a where a sheet press clip 51 is arranged, and a sheet arrangement region 50b that is a region other than the clip arrangement region 50a (see FIG. 7). In this embodiment, the predetermined position represents an upper left corner portion and an upper end portion of the sheet arrangement region 50b of the tray 5. That is, the third images 43 include a triangle image 43a having a right triangle shape that coincides with the upper left corner portion of the sheet arrangement region 50b, and a straight line image 43b defined by extending a straight line extending from a side of the triangle image 43a parallel to the X direction to the end of the color chart sheet 4 on the +X side.

The user arranges the color chart sheet 4 at the tray 5 so that the straight line image 43b coincides with the upper end of the sheet arrangement region 50b of the tray 5, that is, the lower end of the clip arrangement region 50a of the tray 5.

In addition, as illustrated in FIGS. 5 and 6, the color chart sheet 4 includes fourth images 46. The fourth images 46 are images indicating portions to be noticed in work steps from arrangement of the color chart sheet 4 at the tray 5 to color measurement on the color chart 41, and the order of the work steps. The fourth images 46 include a first number image 46a arranged near the triangle image 43a and indicating a number "1", and a second number image 46b arranged near the straight line image 43b and indicating a number "2". In addition, the fourth images 46 include a third number image 46c arranged on the +Y side of the first image 42a and indicating a number "3", a fourth number image 46d arranged on the +X side of the first image 42a and indicating a number "4", a fifth number image 46e arranged on the +Y side of the second image 42b and indicating a number "5", and a sixth number image 46f arranged on the −X side of the second image 42b and indicating a number "6".

The first number image 46a is an image indicating a portion to be noticed during arrangement of the color chart sheet 4 at the tray 5, which is a first work step. The second number image 46b is an image indicating a portion to be noticed during clipping of the color chart sheet 4 by the sheet press clip 51, which is a second work step. The third number image 46c is an image indicating a portion to be noticed at start of color measurement of the colorimeter 2 in the forward path in the leading line of the color chart 41, which is a third work step. The fourth number image 46d is an image indicating a portion to be noticed during movement of the colorimeter 2 in the forward path of the color chart 41. The fifth number image 46e is an image indicating a portion to be noticed at start of color measurement of the colorimeter 2 in the return path in the leading line of the color chart 41, which is a fifth work step. The sixth number image 46f is an image indicating a portion to be noticed during movement of the colorimeter 2 in the return path of the color chart 41.

In addition, as illustrated in FIGS. 5 and 6, the color chart sheet 4 includes supplemental images 47. The supplemental images 47 include a first clip position image 47a, a second clip position image 47b, a forward movement direction image 47c, and a return movement direction image 47d. Ellipses indicated by broken lines surrounding the supplemental images 47 are added for the convenience of explanation, and are not printed on the color chart sheet 4.

The first clip position image 47a is an image indicating a clipping work and is arranged near the straight line image 43b and the second number image 46b. The second clip position image 47b is an image indicating a clipping work and is arranged on the +X side with respect to the first clip position image 47a and near the straight line image 43b. The forward movement direction image 47c is an image indicating the movement direction of the colorimeter 2 in the forward path of the color chart 41, and is arranged near the fourth number image 46d. The return movement direction image 47d is an image indicating the movement direction of the colorimeter 2 in the return path of the color chart 41, and is arranged near the sixth number image 46f.

In addition, as illustrated in FIG. 5, the color chart sheet 4 includes a chart information image 48. The chart information image 48 is an image indicating an identification number of the color chart 41 and its page number. The chart information image 48 may include, in addition to the above-described information, the resolution of the color chart 41, the patch size, the model information on the printing apparatus 1 that printed the color chart sheet 4, and the printed date and time of the color chart sheet 4. For the information on the model information and the printed date and time, image data indicating the information is added to image data of the color chart sheet 4 included in a color measurement assist program 37a when the print instruction for the color chart sheet 4 is accepted, and color chart sheet print data for printing the color chart sheet 4 is generated. Alternatively, the chart information image 48 may be a code image such as a bar code, which is not instantly understood by a person.

Figure 7:
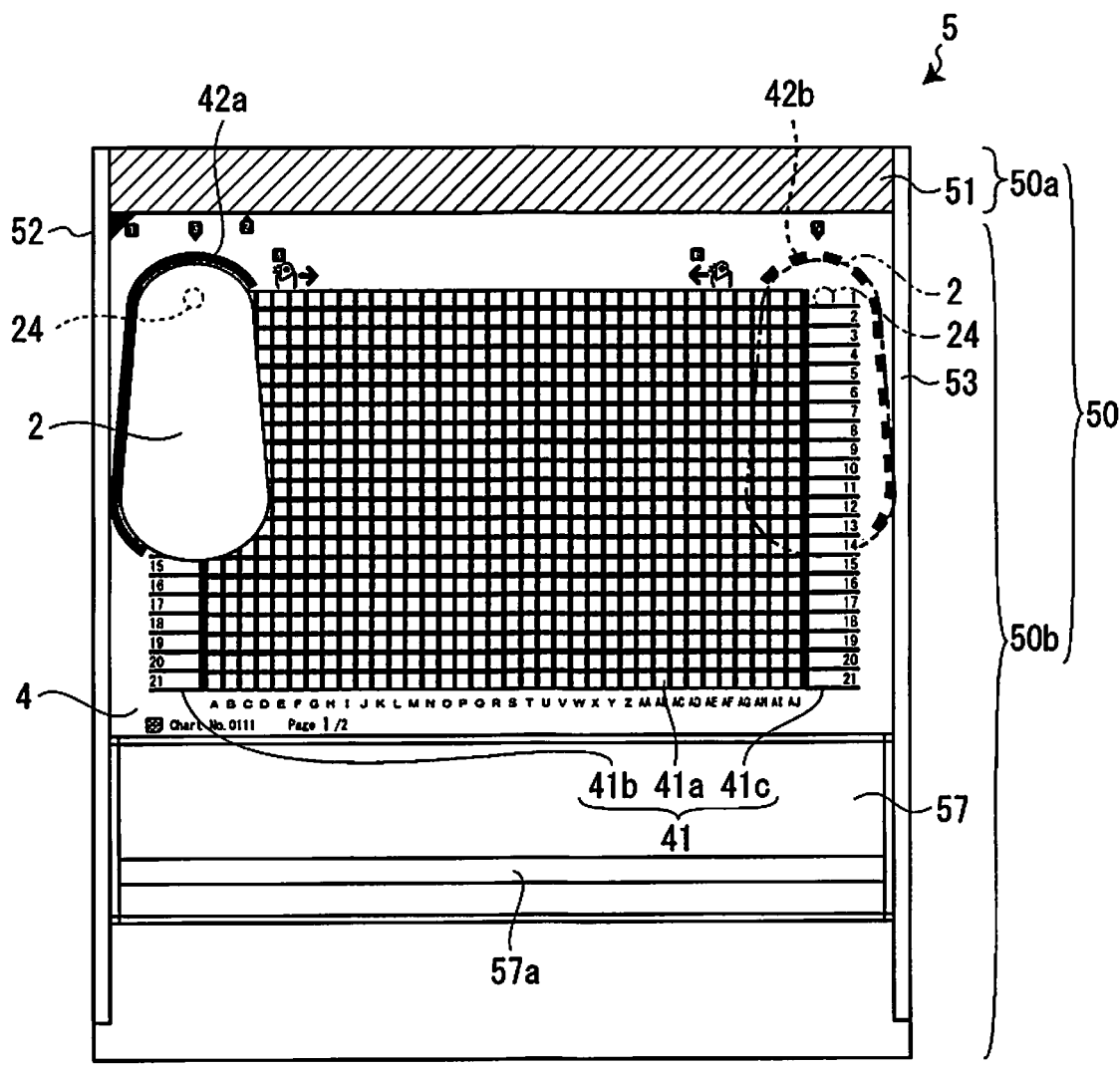
FIG. 7 is a view of, from above a tray, a situation in which color measurement is performed on the color chart sheet.
Figure 8:
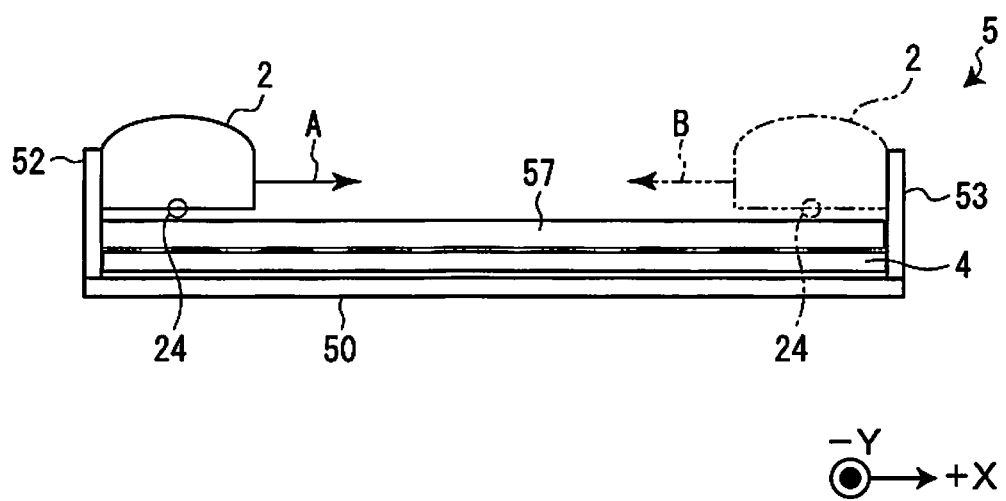
FIG. 8 is a sectional view of the tray in the situation in which color measurement is performed on the color chart sheet.

FIG. 7 is a view of, from above the tray 5, a situation in which color measurement is performed on the color chart sheet 4. FIG. 8 is a sectional view of the tray 5 in the situation in which color measurement is performed on the color chart sheet 4. In FIGS. 7 and 8, the hand of the user is not illustrated. As illustrated in FIGS. 7 and 8, the tray 5 includes the tray body 50, the sheet press clip 51 provided on the +Y side of the tray body 50, a left end plate 52 provided at the end on the −X side of the tray body 50, and a right end plate 53 provided at the end on the +X side of the tray body 50.

As illustrated in FIG. 7, the tray body 50 is divided into the clip arrangement region 50a where the sheet press clip 51 is arranged, and the sheet arrangement region 50b that is the region other than the clip arrangement region 50a. The length between the left end plate 52 and the right end plate 53 is substantially the same as the length of the color chart sheet 4 in the X direction. The length of the sheet arrangement region 50b in the Y direction is larger than a value obtained by adding the length of the color measurement guide 57 in the Y direction to the length of the color chart sheet 4 in the Y direction. In addition, the length of the color measurement guide 57 in the X direction is substantially the same as the length of the color chart sheet 4 in the X direction.

As illustrated in FIGS. 7 and 8, the colorimeter 2 indicated by a solid line is the colorimeter 2 in the state in which the colorimeter 2 is arranged at the color measurement start position in the forward path indicated by the first image 42a of the color chart 41. At this time, the optical sensor 24 of the colorimeter 2 is located in the patch group left region 41b. In other words, the PC 3 causes the printing apparatus 1 to print the color chart sheet 4 configured such that the length from the left end of the color chart sheet 4 to the left end of the patch group region 41a is larger than the length from the left end of the colorimeter 2 arranged to meet the position and direction of the first image 42a to the optical sensor 24. With this configuration, by arranging the colorimeter 2 to meet the position and direction of the first image 42a, the user can start the color measurement in the forward direction from a blank region located outside the patch group region 41a, and can prevent failure in color measurement. Solid-line arrow A illustrated in FIG. 8 indicates the movement direction of the colorimeter 2 in the forward direction.

As illustrated in FIGS. 7 and 8, the colorimeter 2 indicated by imaginary lines is the colorimeter 2 in the state in which the colorimeter 2 is arranged at the color measurement start position in the return path indicated by the second image 42b of the color chart 41. At this time, the optical sensor 24 of the colorimeter 2 is located in the patch group right region 41c. In other words, the PC 3 causes the printing apparatus 1 to print the color chart sheet 4 configured such that the length from the right end of the color chart sheet 4 to the right end of the patch group region 41a is larger than the length from the right end of the colorimeter 2 arranged to meet the position and direction of the second image 42b to the optical sensor 24. With this configuration, by arranging the colorimeter 2 to meet the position and direction of the second image 42b, the user can start the color measurement in the return direction from a blank region located outside the patch group region 41a, and can prevent failure in color measurement. Imaginary-line arrow B illustrated in FIG. 8 indicates the movement direction of the colorimeter 2 in the return direction.

In this embodiment, the color measurement start position in the return path of the color chart 41 coincides with the color measurement end position in the forward path of the color chart 41, and the color measurement start position in the forward path of the color chart 41 coincides with the color measurement end position in the return path of the color chart 41. That is, the colorimeter body 20 may be located at the position indicated by the second image 42b when the color measurement in the forward path of the color chart 41 is ended, and the colorimeter body 20 may be located at the position indicated by the first image 42a when the color measurement in the return path of the color chart 41 is ended. With this configuration, by moving the colorimeter 2 in the forward direction to the position indicated by the second image 42b, the user can perform the color measurement to the blank region located outside the patch group region 41a, and can prevent failure in color measurement. In addition, by moving the colorimeter 2 in the return direction to the position indicated by the first image 42a, the user can perform the color measurement to the blank region located outside the patch group region 41a, and can prevent failure in color measurement.

Alternatively, in the forward path, the colorimeter 2 may be moved to the position at which the colorimeter 2 contacts the right end plate 53 located on the right side with respect to the position indicated by the second image 42b. In the return path, the colorimeter 2 may be moved to the position at which the colorimeter 2 contacts the left end plate 52 located on the left side with respect to the position indicated by the first image 42a. That is, the color measurement start position in the forward path may not correspond to the color measurement end position in the return path, and the color measurement start position in the return path may not coincide with the color measurement end position in the forward path.

Figure 9:
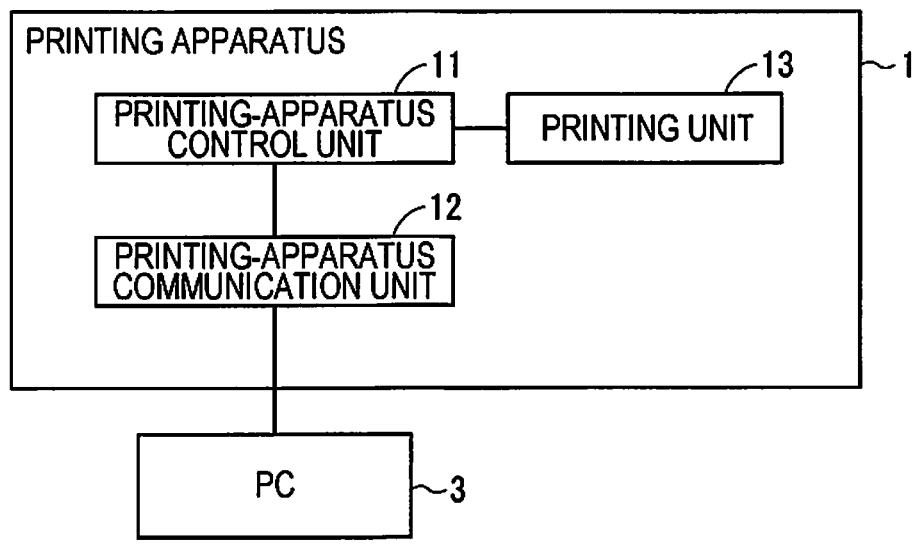
FIG. 9 is a block diagram illustrating a control system of a printing apparatus.

FIG. 9 is a block diagram illustrating a control system of the printing apparatus 1. The printing apparatus 1 includes a printing-apparatus control unit 11, a printing-apparatus communication unit 12, and a printing unit 13. The printing-apparatus control unit 11 controls the printing unit 13 based on an instruction from the PC 3. For example, when acquiring color chart sheet print data from the PC 3, the printing-apparatus control unit 11 causes the printing unit 13 to print the color chart sheet 4 based on the acquired color chart sheet print data. The printing-apparatus communication unit 12 communicates with the PC 3. The printing unit 13 performs printing on a printing medium such as a printing sheet by a printing system, such as an ink jet system or an electrophotographic system.

Figure 10:
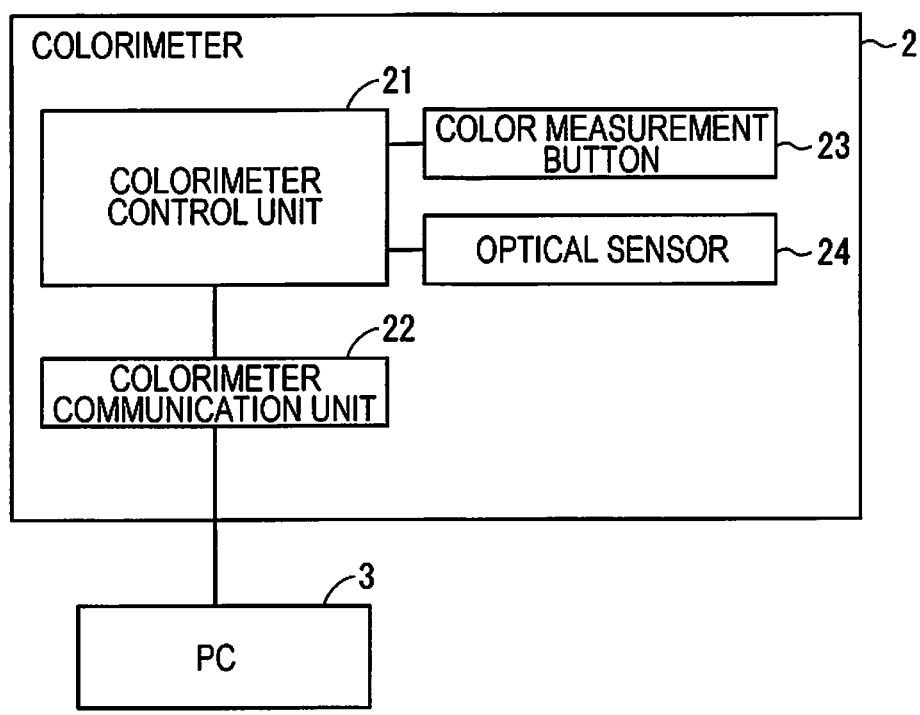
FIG. 10 is a block diagram illustrating a control system of the colorimeter.

FIG. 10 is a block diagram illustrating a control system of the colorimeter 2. The colorimeter 2 includes a colorimeter control unit 21, a colorimeter communication unit 22, a color measurement button 23, an optical sensor 24, and a light source. When the color measurement button 23 is pressed, the colorimeter control unit 21 transmits a press start signal to the PC 3. When the color measurement button 23 is released, the colorimeter control unit 21 transmits a press release signal to the PC 3. The colorimeter control unit 21 may transmit a repeat press signal to the PC 3 while the color measurement button 23 is pressed.

In addition, the colorimeter control unit 21 periodically acquires the read result of the optical sensor 24 while the color measurement button 23 is pressed, and periodically transmits the acquired read result as colorimetric value data to the PC 3. The colorimeter control unit 21 periodically transmits the colorimetric value data concurrently with the reading by the optical sensor 24. The reading and transmission may be performed synchronously with each other, or may be performed on different cycles. The colorimeter control unit 21 may transmit, at a timing at which the color measurement button 23 is released, the colorimetric value data acquired and stored while the color measurement button 23 is pressed.

The colorimeter communication unit 22 communicates with the PC 3. The color measurement button 23 is a button that the user presses during color measurement. The optical sensor 24 is configured to measure the spectral reflectance of each of partial wavelength ranges obtained by dividing a wavelength range including a visible light range into a plurality of partial wavelength ranges, and includes a light emitter, a light receiver, and an analog/digital (A/D) converter. In the optical sensor 24, the light emitter including a light source irradiates each patch provided at the color chart 41 with light, and the light receiver receives the reflected light. In addition, in the optical sensor 24, the A/D converter converts the amount of light received by the light receiver into an electric signal, and outputs the converted electric signal to the colorimeter control unit 21.

Figure 11:
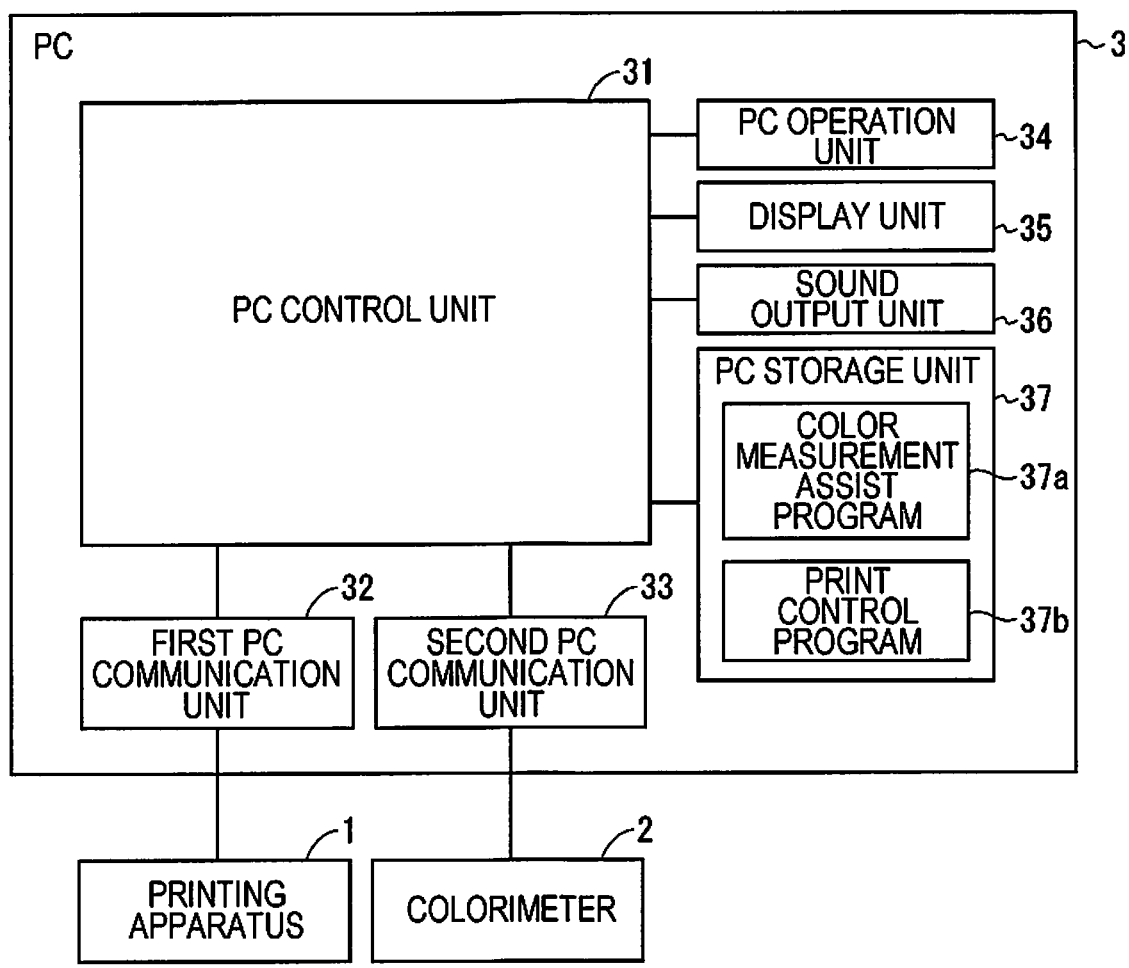
FIG. 11 is a block diagram illustrating a control system of a personal computer (PC).

FIG. 11 is a block diagram illustrating a control system of the PC 3. The PC 3 includes a PC control unit 31, a first PC communication unit 32, a second PC communication unit 33, a PC operation unit 34, a display unit 35, a sound output unit 36, and a PC storage unit 37. The PC storage unit 37 is, for example, a hard disk drive (HDD), and stores the color measurement assist program 37a and a print control program 37b. The PC control unit 31 is an example of "a control unit" and "a computer". In addition, the color measurement assist program 37a is an example of "a program".

The color measurement assist program 37a is a program for causing the printing apparatus 1 to print the color chart sheet 4. The color measurement assist program 37a includes image data for generating print data of the color chart sheet 4, and reference color data indicating a reference color of each patch included in the color chart 41. The color measurement assist program 37a includes a plurality of types of image data and a plurality of types of reference color data to correspond to a plurality of types of color chart sheets 4.

The color measurement assist program 37a is also a program for assisting the operation of the user to move the colorimeter 2 with respect to the color chart 41. In addition, the color measurement assist program 37a is a program that generates color adjustment data for performing color adjustment of the printing apparatus 1 based on the colorimetric value data acquired from the colorimeter 2, and that registers the generated color adjustment data in the print control program 37b.

The print control program 37b is a program for causing the printing apparatus 1 to print a matter to be printed other than the color chart sheet 4.

The PC control unit 31 includes a processor such as a central processing unit (CPU), and memories such as a random access memory (RAM) and a read only memory (ROM). The RAM is used as a working area of the CPU. In addition, the ROM stores the control program and so forth of the PC 3.

The PC control unit 31 performs, based on the color measurement assist program 37a, print control that causes the printing apparatus 1 to print the color chart sheet 4, color measurement assist control that assists the operation of the user to move the colorimeter 2, and color adjustment control that generates the color adjustment data based on the colorimetric value data and registers the generated color adjustment data in the print control program 37b. Specific processes based on the control of the PC control unit 31 are described later.

The first PC communication unit 32 communicates with the printing apparatus 1. The second PC communication unit 33 communicates with the colorimeter 2. The PC operation unit 34 is, for example, a mouse, a keyboard, or a touch panel, and that is used for the user operating various types of operations. The display unit 35 displays various information, such as a color chart setting screen for setting relating to the color measurement on the color chart 41.

In the color chart setting screen, for example, the type of the colorimetric value, the method of displaying the color measurement result, and the type of the colorimeter 2 are set. The type of the colorimetric value is one selected from L*a*b, Lch, reflection density, and spectral reflectance. In this embodiment, L*a*b is selected as the type of the colorimetric value. In addition, as the method of displaying the color measurement result, selection is made whether the colorimetric value data is displayed in a table form or a grid form; and selection is also made whether the color difference between the forward color measurement result and the return color measurement result is displayed or not. The type of the colorimeter 2 is associated with the corresponding type of the color chart sheet 4. Different color chart sheets 4 are printed in accordance with the type of the colorimeter 2 selected in the color chart setting screen. The sound output unit 36 outputs a sound for assisting the operation of the user to move the colorimeter 2.

Figure 12:
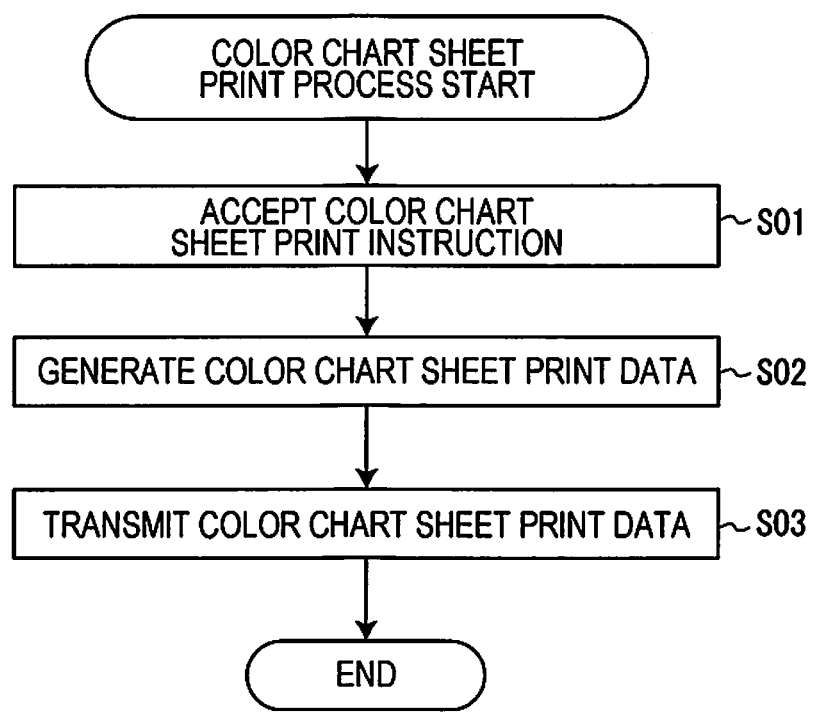
FIG. 12 is a flowchart illustrating a color chart sheet print process.

FIG. 12 is a flowchart illustrating a color chart sheet print process that starts when the color measurement assist program 37a is activated. When accepting a print instruction for the color chart sheet 4 by an operation with the PC operation unit 34 (S01), the PC control unit 31 generates color chart sheet print data for causing the printing apparatus 1 to print a color chart sheet 4 (S02). The PC control unit 31 collects information required for generating a chart information image 48 and generates the chart information image 48. In addition, the PC control unit 31 selects image data of the color chart sheet 4 corresponding to the type of the colorimeter 2 selected in the color chart setting screen, and generates the color chart sheet print data. The PC control unit 31 transmits the generated color chart sheet print data to the printing apparatus 1 via the first PC communication unit 32 (S03).

Figure 13:
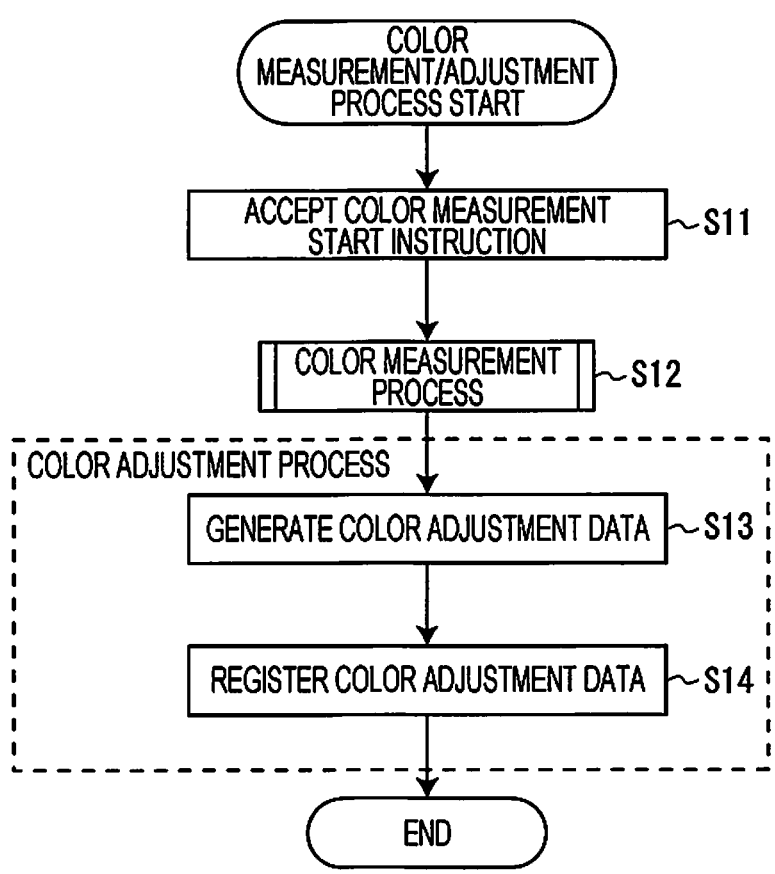
FIG. 13 is a flowchart illustrating a color measurement/adjustment process.

FIG. 13 is a flowchart illustrating a color measurement/adjustment process. When accepting a color measurement start instruction for the color chart 41 by an operation with the PC operation unit 34 (S11), the PC control unit 31 performs a color measurement process (S12). The PC control unit 31 acquires colorimetric value data of all patches included in the color chart 41 by the color measurement process. The PC control unit 31 performs a color adjustment process after the color measurement process. The color adjustment process includes a step of generating color adjustment data (S13) and a step of registering the color adjustment data (S14).

In the step of generating the color adjustment data (S13), the PC control unit 31 generates color adjustment data for performing color adjustment of the printing apparatus 1 based on the acquired colorimetric value data. The color adjustment data is data for bringing the color of each acquired patch based on the colorimetric value data of the patch close to the reference color of the corresponding patch. The PC control unit 31 generates color adjustment data that is data for adjustment to cause each patch to be printed with the corresponding reference color, by using colorimetric value data based on the L*a*b color space of each acquired patch, and the reference color data based on the L*a*b color space included in the color measurement assist program 37a. When certain reference color data is deviated from corresponding colorimetric value data, and calculation is made and indicates that the reference color data and the colorimetric value data can coincide with each other by increasing the amount of black ink by X %, the color adjustment data includes, for example, information to increase the amount of black ink by X % when printing is performed with the reference color. In addition, in the step of registering the color adjustment data (S14), the PC control unit 31 registers the generated color adjustment data in the color measurement assist program 37a and the print control program 37b. Accordingly, when the color chart sheet 4 is printed next time using the color measurement assist program 37a and when printing is performed using the print control program 37b, printing is more likely performed with the reference color in the portion at which printing is to be performed with the reference color.

In this way, since the PC control unit 31 performs the color adjustment process, a new first printing system SY1 with color adjustment completed can be produced. The color chart print process illustrated in FIG. 12 and the color measurement/adjustment process illustrated in FIG. 13 are examples of "a method of producing a printing system".

Figure 14:
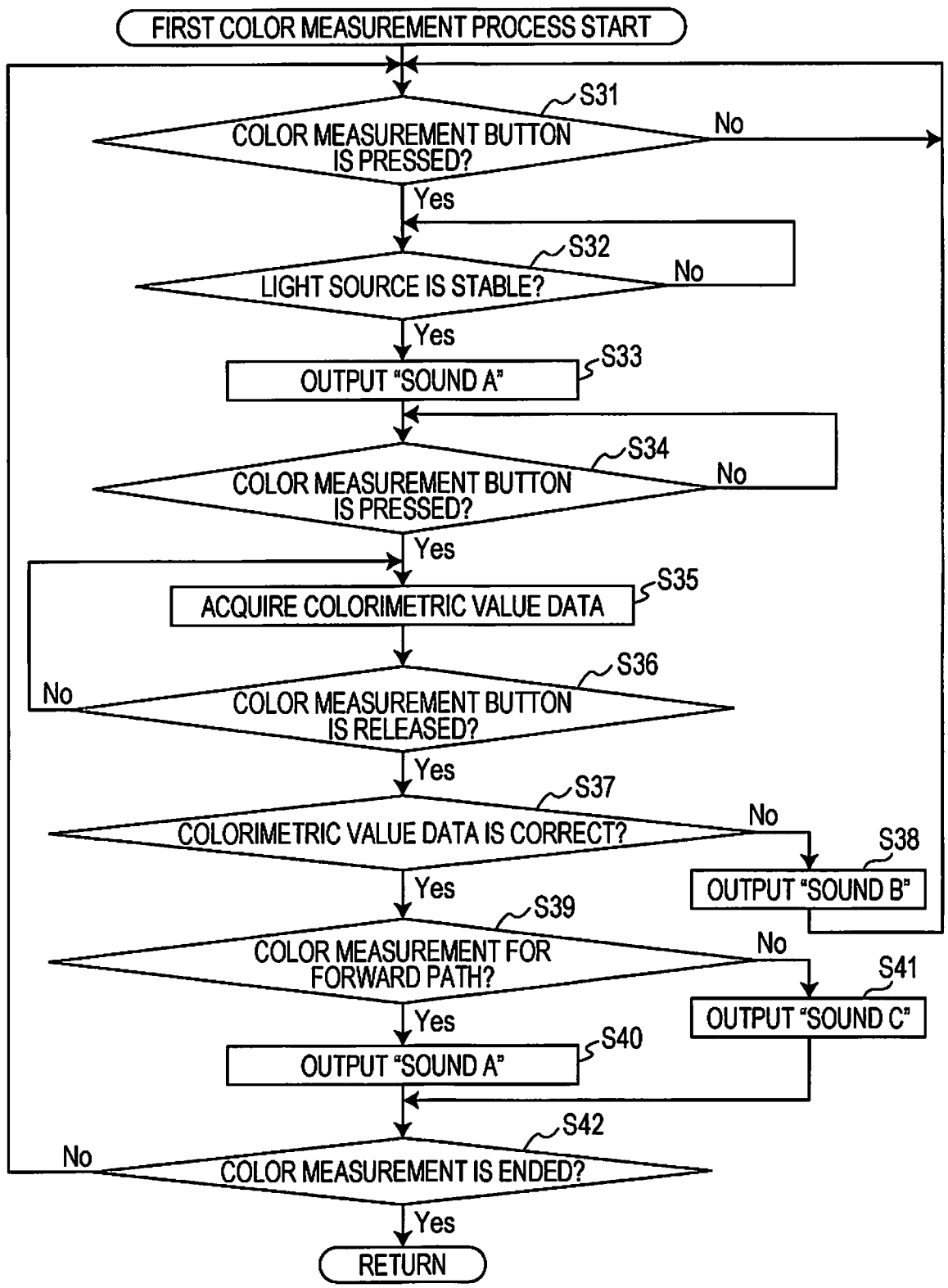
FIG. 14 is a flowchart illustrating a first color measurement process.

FIG. 14 is a flowchart illustrating a first color measurement process. The flowchart is a sub-flowchart corresponding to step S12 of the flowchart illustrated in FIG. 13. When the first color measurement process is started, the PC control unit 31 determines whether the color measurement button 23 is pressed or not (S31). The determination whether the color measurement button 23 is pressed or not is made based on whether the press start signal is received from the colorimeter 2 or not. When determining that the color measurement button 23 is not pressed (S31: No), the PC control unit 31 returns to step S31. When determining that the color measurement button 23 is pressed (S31: Yes), the PC control unit 31 determines whether the light source of the optical sensor 24 is stable or not (S32). The determination whether the light source is stable or not is made based on whether a predetermined time has elapsed or not since the color measurement button 23 has been pressed.

When determining that the light source is not stable (S32: No), the PC control unit 31 returns to step S32. When determining that the light source is stable (S32: Yes), the PC control unit 31 outputs "a sound A" by using the sound output unit 36 (S33). "The sound A" is a sound indicating start of color measurement, and is, for example, a one-time short notification sound. The PC control unit 31 determines whether the color measurement button 23 is pressed or not (S34), and when determining that the color measurement button 23 is not pressed (S34: No), the PC control unit 31 returns to step S34. In addition, when determining that the color measurement button 23 is pressed (S34: Yes), the PC control unit 31 acquires colorimetric value data from the colorimeter 2 (S35).

Then, the PC control unit 31 determines whether the color measurement button 23 is released or not (S36). The determination whether the color measurement button 23 is released or not is made based on whether the press release signal is received from the colorimeter 2 or not. When determining that the color measurement button 23 is not released (S36: No), the PC control unit 31 returns to step S35. When determining that the color measurement button 23 is released (S36: Yes), the PC control unit 31 determines whether the colorimetric value data acquired from the colorimeter 2, that is, the colorimetric value data for one line of patches based on forward movement or return movement of the colorimeter 2 is correct or not (S37). The determination whether the colorimetric value data is correct or not is made based on a predetermined determination algorithm of, for example, comparing the acquired colorimetric value data of each patch with the corresponding previously stored reference color data of the patch, and determining whether the difference is smaller than a threshold or not. In addition, in step S37, it is determined whether the colorimetric value data is acquired by forward color measurement or return color measurement, and the determination result is stored as a flag.

When determining that the colorimetric value data is not correct (S37: No), the PC control unit 31 outputs "a sound B" by using the sound output unit 36 (S38), and returns to step S31. "The sound B" is a sound indicating failure in color measurement, and is, for example, a one-time long notification sound. When determining that the colorimetric value data is correct (S37: Yes), the PC control unit 31 determines whether the acquired colorimetric value data is the colorimetric value data based on forward color measurement of the colorimeter 2 or not (S39). The determination whether the colorimetric value data is based on forward color measurement of the colorimeter 2 or not is made based on, for example, the flag indicating whether color measurement is forward color measurement or return color measurement.

When determining that the acquired colorimetric value data is the colorimetric value data based on forward color measurement of the colorimeter 2 (S39: Yes), the PC control unit 31 outputs "the sound A" by using the sound output unit 36 (S40). "The sound A" in this case is a sound indicating success of forward color measurement, and is the same sound as the sound output in step S33. In addition, when determining that the acquired calorimetric value data is not the colorimetric value data based on forward color measurement of the colorimeter 2 (S39: No), the PC control unit 31 outputs "a sound C" by using the sound output unit 36 (S41). "The sound C" is a sound indicating success of return color measurement, and is, for example, a two-time short notification sound.

After step S40 or S41, the PC control unit 31 determines whether color measurement has been ended for all patches included in the color chart 41 or not (S42). When determining that the color measurement has been ended (S42: Yes), the PC control unit 31 ends the first color measurement process. When determining that the color measurement has not been ended for all patches included in the color chart 41 (S42: No), the PC control unit 31 returns to step S31.

As described above, according to the first embodiment, the color chart sheet 4 includes the first image 42a indicating the color measurement start position and the color measurement start direction of the colorimeter 2 in the forward path in the leading line of the color chart 41. Thus, the position at which color measurement is to be started and the direction in which the colorimeter 2 is arranged at color measurement start can be presented to the user with ease of understanding. Similarly, the color chart sheet 4 includes the second image 42b indicating the color measurement start position and the color measurement start direction of the colorimeter 2 in the backward path in the leading line of the color chart 41. Thus, the position at which color measurement in the return path is to be started and the direction in which the colorimeter 2 is arranged at color measurement start in the return path can be presented to the user with ease of understanding.

The first image 42a indicates at least a portion of the contour of the colorimeter 2 when the colorimeter 2 is arranged at the color measurement start position of the colorimeter 2 in the forward path in the leading line of the color chart 41. Thus, the first image 42a can provide the color measurement start position and the color measurement start direction in the forward path of the colorimeter 2 to the user with ease of understanding. Similarly, the second image 42b indicates at least a portion of the contour of the colorimeter 2 when the colorimeter 2 is arranged at the color measurement start position of the colorimeter 2 in the return path in the leading line of the color chart 41. Thus, the first image 42a can provide the color measurement start position and the color measurement start direction in the return path of the colorimeter 2 to the user with ease of understanding.

In addition, the color chart sheet 4 includes the third images 43 corresponding to the upper left corner portion and the upper end portion of the sheet arrangement region 50b of the tray 5 at which the color chart sheet 4 is arranged. Thus, the position of the tray 5 at which the color chart sheet 4 is to be arranged can be presented to the user with ease of understanding. In addition, the color chart sheet 4 includes the fourth images 46 indicating the portions to be noticed in the work steps from arrangement of the color chart sheet 4 at the tray 5 to color measurement on the color chart 41, and the order of the work steps. Thus, the order of the work steps and the portions to be noticed in the work steps can be presented to the user with ease of understanding.

In addition, the PC control unit 31 outputs different sounds when color measurement is in failure, forward color measurement is successful, and return color measurement is successful in the first color measurement process. Thus, the result whether color measurement is successful or not, and the next color measurement to be performed is whether forward color measurement or return color measurement can be presented to the user with ease of understanding.

In the first embodiment, the following modifications can be employed.

Modification 1-1

In the first embodiment, color measurement is performed for one line of patches by the reciprocating movement of the colorimeter 2. However, color measurement may be performed for one line of patches by one-way movement of the colorimeter 2. That is, color measurement may be performed for one line of patches by one-time scanning. In the first embodiment, the colorimeter 2 that is manually moved is used; however, a colorimeter that is automatically moved may be used. With the colorimeter that is automatically moved, the first image 42a can provide the position at which the colorimeter 2 is to be initially arranged to the user. When the colorimeter 2 that is automatically moved in the Y direction in addition to the X direction of the color chart 41 is used, printing of the second image 42b may be omitted.

Modification 1-2

The patches of the color chart 41 are not limited to be arranged in the matrix form, and may be arranged in a line form, such as a straight line form or a curved line form. In addition, the shape of each patch is not limited to a rectangular shape, and may be other shape such as a circular shape.

In addition, the plurality of patches included in the color chart 41 may not have the same shape, and may not be arranged at regular intervals.

Modification 1-3

The PC control unit 31 outputs the same sound when color measurement is started and when forward color measurement is successful in the first color measurement process (see steps S33 and S40 in FIG. 14); however, the PC control unit 31 may output different sounds. In addition, the PC control unit 31 may output voice guidance, such as "color measurement is started" and "forward color measurement is successful", instead of outputting the notification sounds. In this case, when forward color measurement is successful, voice guidance of urging the user to perform return color measurement such as "return color measurement is performed next" may be output. In addition, when return color measurement is successful, voice guidance of indicating the number of line on which color measurement is performed next such as "forward color measurement is performed in second line next, please move color measurement guide by one line of patches" may be output, and also sound guidance of urging the user to perform return color measurement and to move the color measurement guide 57 may be output. Furthermore, when color measurement failed, voice guidance of indicating failure in color measurement and urging the user to perform color measurement again such as "color measurement failed, please perform forward color measurement again" may be output.

Modification 1-4

In the first embodiment, color measurement environment is previously determined. However, the PC control unit 31 may acquire color measurement environment when performing print control, and cause a color chart sheet to be printed based on the acquired color measurement environment. Thus, a plurality of color measurement environments can be handled. In this case, the color measurement environment is environment under which the user performs color measurement, such as the colorimeter to be used, the tray to be used, and the color measurement guide to be used. The PC control unit 31 may acquire the color measurement environment by the user designating the color measurement environment. Alternatively, color measurement environment relating to a colorimeter may be acquired by acquiring information on the colorimeter from the colorimeter coupled to the PC 3; or a portion or the entirety of color measurement environment may be acquired by analyzing the image of, for example, the colorimeter, tray, or color measurement guide included in the image taken by a camera coupled to the PC 3 and specifying the colorimeter, tray, or color measurement guide. Accordingly, the color chart sheet including the first image, second image, third images, and supplemental images provided at the positions corresponding to the color measurement environment and having shapes compliant with the color measurement environment can be printed. For example, when the colorimeter has a triangular plan shape, the first image and second image may be triangular. When the position of the clip of the tray is located at the lower side of the set color chart sheet, the clip position image may be located at the lower side of the color chart sheet.

Second Embodiment

A second embodiment is described next. In the second embodiment, the PC 3, based on the color measurement assist program 37a, assists the operation of the user to move the colorimeter 2 with respect to the color chart 41. Particularly in this embodiment, the PC 3 presents, to the user, information indicating the difference between an actual speed that is a moving speed of the colorimeter 2 when the PC 3 performs color measurement on the color chart 41 and an ideal speed that is a moving speed of the colorimeter 2 ideal for color measurement on the color chart 41. The points different from the first embodiment are mainly described below. In this embodiment, like reference signs are applied to components like those in the first embodiment, and the detailed description thereof is omitted. In addition, modifications applied to the components like those in the first embodiment are likewise applied to this embodiment. The moving speed in this specification is the relative speed between the color chart 41 and the colorimeter 2, and is established also when a colorimeter is fixed to a desk and a color chart is moved.

Figure 15:
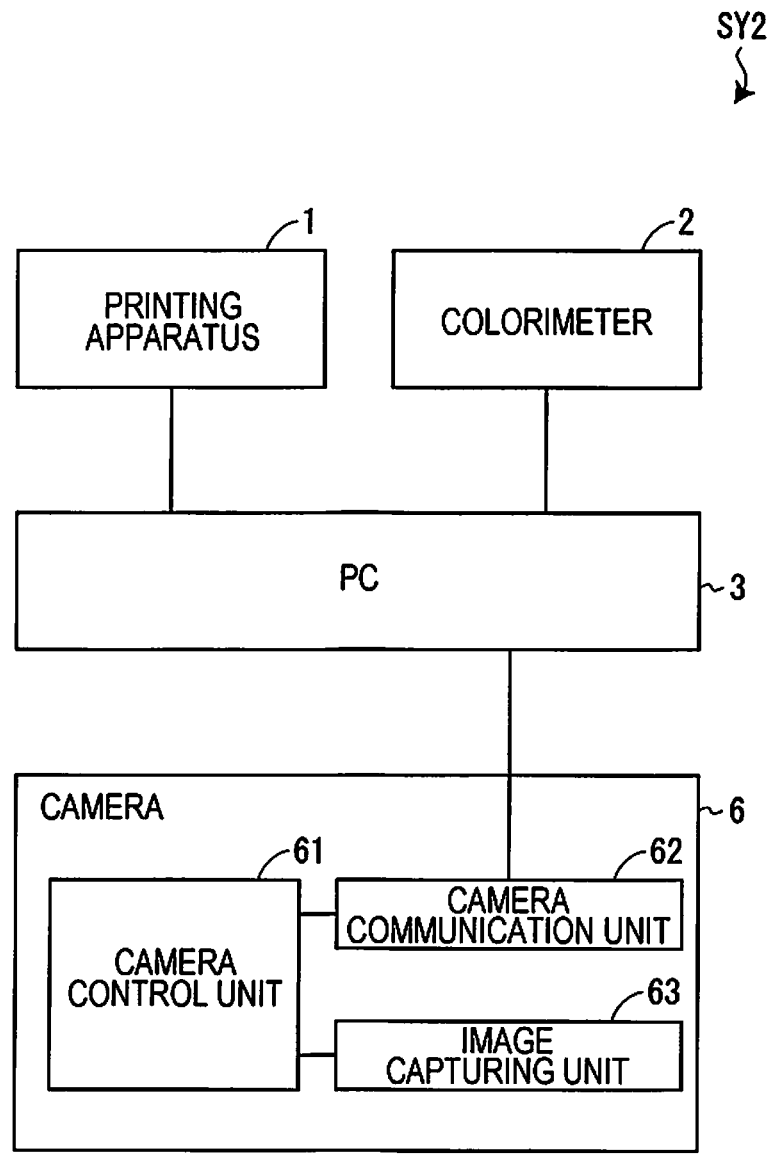
FIG. 15 is a system configuration diagram of a second printing system.

FIG. 15 is a system configuration diagram of a second printing system SY2. The second printing system SY2 includes a printing apparatus 1, a colorimeter 2, a PC 3, and a camera 6. For control systems of the printing apparatus 1, the colorimeter 2, and the PC 3, configurations similar to those of the first embodiment may be employed. The camera 6 is used for measuring the moving speed of the colorimeter 2.

The camera 6 includes a camera control unit 61, a camera communication unit 62, and an image capturing unit 63. The camera control unit 61 generates a captured movie that is a result of capturing by the image capturing unit 63. The camera control unit 61 transmits the captured movie via the camera communication unit 62 to the PC 3 in real time concurrently with capturing by the image capturing unit 63. The image capturing unit 63 captures an image by using only one metal oxide semiconductor (MOS) sensor chip. Alternatively, the image capturing unit 63 may capture an image by using a charge-coupled device (CCD) sensor chip or plurality of sensor chips.

The image capturing unit 63 captures an image of a state in which the user moves the colorimeter 2 with respect to the color chart 41. The image capturing unit 63 may capture an image from the +Y side of the color chart sheet 4 and from above so that user's hand does not hide the colorimeter 2. Thus, the PC 3 can accurately measure the moving speed of the colorimeter 2. Without being limited to image capturing by the camera 6 provided separately from the PC 3, an image capturing function provided in the PC 3 may be used for image capturing.

In this embodiment, the PC control unit 31 causes the display unit 35 to display information indicating the difference between an actual speed that is a moving speed of the colorimeter 2 when the user moves the colorimeter 2 with respect to the color chart 41 and an ideal speed that is a moving speed of the colorimeter 2 ideal for color measurement on the color chart 41 (hereinafter, referred to as "information indicating speed difference"). The display unit 35 is an example of "a presenting unit".

The PC control unit 31 acquires the color measurement position by receiving the captured movie from the camera 6 and analyzing the received captured movie. The color measurement position represents a position of the color chart 41 in the X direction. The PC control unit 31 calculates the moving speed of the colorimeter 2 based on the change in the acquired color measurement position, and acquires the measured moving speed as an actual speed. In addition, the PC control unit 31 acquires an ideal speed previously stored in the color measurement assist program 37a. The ideal speed is stored for each type of the colorimeter 2. That is, the PC control unit 31 acquires the ideal speed corresponding to the type of the colorimeter 2 selected in the color chart setting screen. In addition, the PC control unit 31 causes the display unit 35 to display information indicating the speed difference based on the measured actual speed and the acquired ideal speed. For example, the PC control unit 31 causes the display unit 35 to display, as information indicating the speed difference, a composite movie 60 in which the captured movie and a movie indicating the ideal speed are combined.

Figure 16:
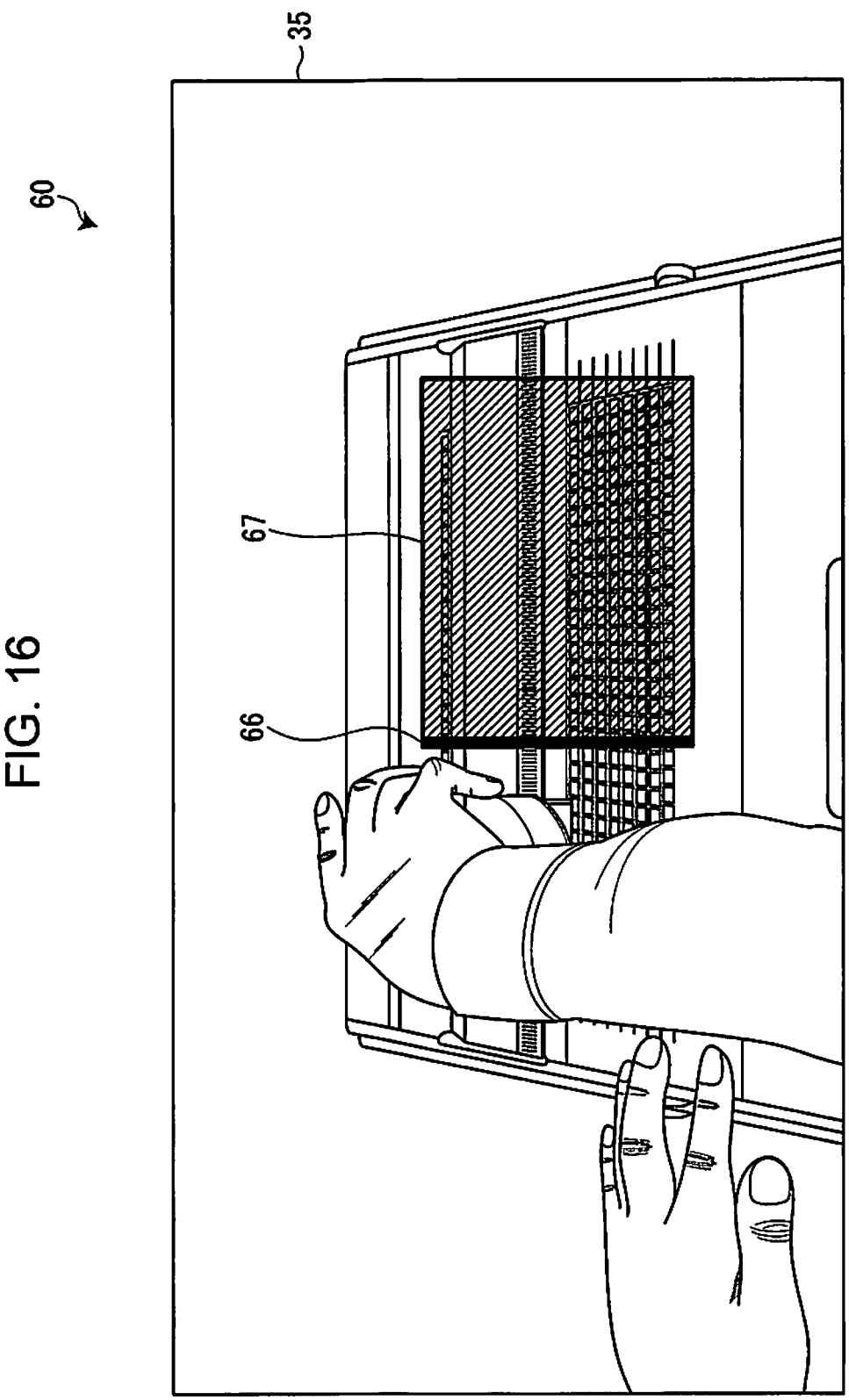
FIG. 16 illustrates a display example of information indicating a speed difference.

FIG. 16 illustrates a display example of the composite movie 60. The PC control unit 31 displays, as the captured movie, the tray 5, the color chart sheet 4, the colorimeter 2, and user's hand that moves the colorimeter 2. In this way, since the captured movie includes the movement of the colorimeter 2, the captured movie serves as a movie indicating the actual speed. In addition, the PC control unit 31 displays, as the movie indicating the ideal speed, a first line image 66 that moves at the ideal and uniform speed on the color chart 41. The first line image 66 indicates color-measurement-target patch row of the color chart 41 when the colorimeter 2 is moved at the ideal speed. The PC control unit 31 determines the position of the tray 5 and the position of the color chart 41 from the captured movie, and determines the display position of the first line image 66 based on the determined position.

The PC control unit 31 moves the first line image 66 in the +X direction of the color chart 41 when forward color measurement is performed, and moves the first line image 66 in the −X direction of the color chart 41 when return color measurement is performed. The movement start timing of the first line image 66 is when the color measurement button 23 of the colorimeter 2 is pressed. The movement end timing of the first line image 66 is when the color measurement button 23 of the colorimeter 2 is released.

The example in FIG. 16 illustrates the composite movie 60 when forward color measurement is performed. The first line image 66 is located in an advancement direction of the colorimeter 2 with respect to the color measurement position of the colorimeter 2 in the X direction of the color chart 41, that is, on the +X side of the color chart 41. This represents that the actual speed is slower than the ideal speed. The user can notice that the movement speed of the colorimeter 2 is desirably increased based on the first line image 66.

In addition, the PC control unit 31 displays, as a portion of the composite movie 60, a movie indicating a row of patches on which color measurement is not performed yet when moving the colorimeter 2 at the ideal speed. The PC control unit 31 determines, from among patch rows included in the color chart 41, a row of patches existing on the advancement direction side of the colorimeter 2 as a row of patches on which color measurement is not performed yet, by using the first line image 66. The PC control unit 31 displays a movie indicating the row of patches on which color measurement is not performed yet in real time. In the example in FIG. 16, a gray-out image 67 is displayed as a movie indicating a row of patches on which color measurement is not performed yet. In the gray-out image 67, the display region is narrowed along with the movement of the first line image 66. The gray-out image 67 is displayed in a manner superposed on the row of patches on which color measurement is not performed yet included in the captured movie. The user can recognize the row of patches on which color measurement is not performed yet from the gray-out image 67, and hence can recognize the movement direction of the colorimeter 2.

As described above, with the second embodiment, the display unit 35 is caused to display the composite movie 60 in which the captured movie and the movie indicating the ideal speed are combined. Thus, the PC control unit 31 can present whether the speed at which the user moves the colorimeter 2 is faster or slower than the ideal speed to the user with ease of understanding. Accordingly, the user can perform color measurement on the color chart 41 at the ideal moving speed, by moving the colorimeter 2 so that the image of the colorimeter 2 included in the captured movie coincides with the movie indicating the ideal speed. Thus, color measurement on the color chart 41 can be performed at the ideal moving speed. In addition, the captured movie is also used for measuring the actual speed in addition to indicating the actual speed. Thus, a measuring tool for measuring the actual speed is not additionally required.

In the second embodiment, the following modifications can be employed.

Modification 2-1

In the second embodiment, the captured movie is transmitted from the camera 6 to the PC 3. However, the camera control unit 61 may measure the moving speed of the colorimeter 2 based on the captured movie, and may transmit the measured moving speed of the colorimeter 2 to the PC 3.

Modification 2-2

Figure 17:
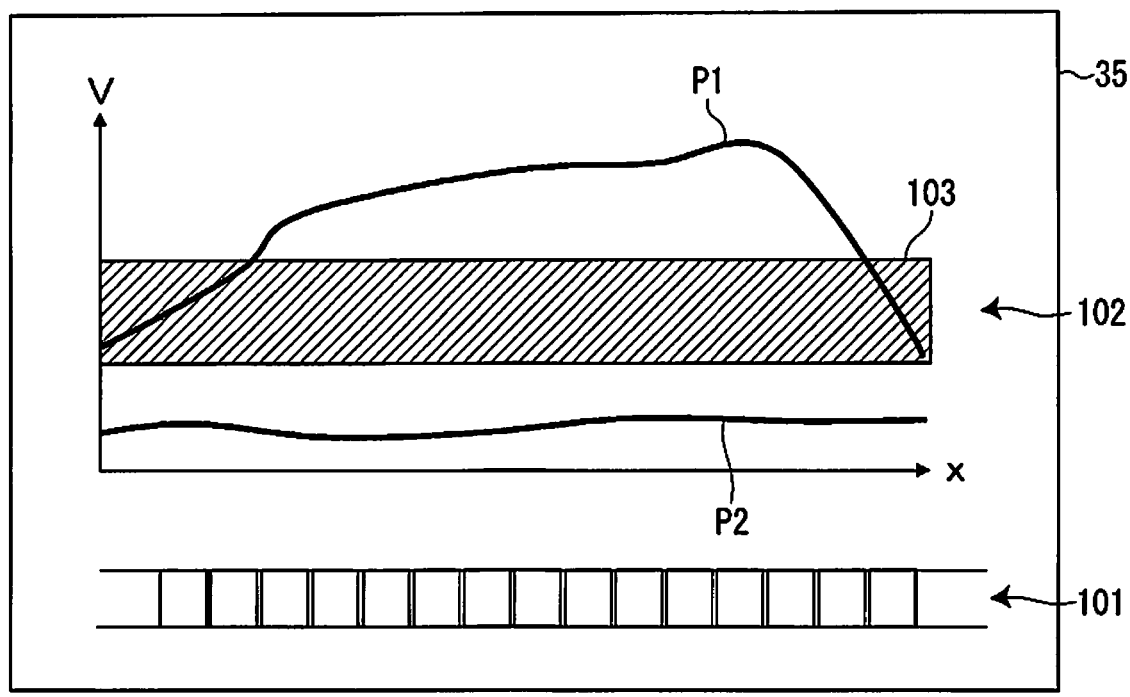
FIG. 17 illustrates a display example of information indicating a speed difference.
Figure 18:
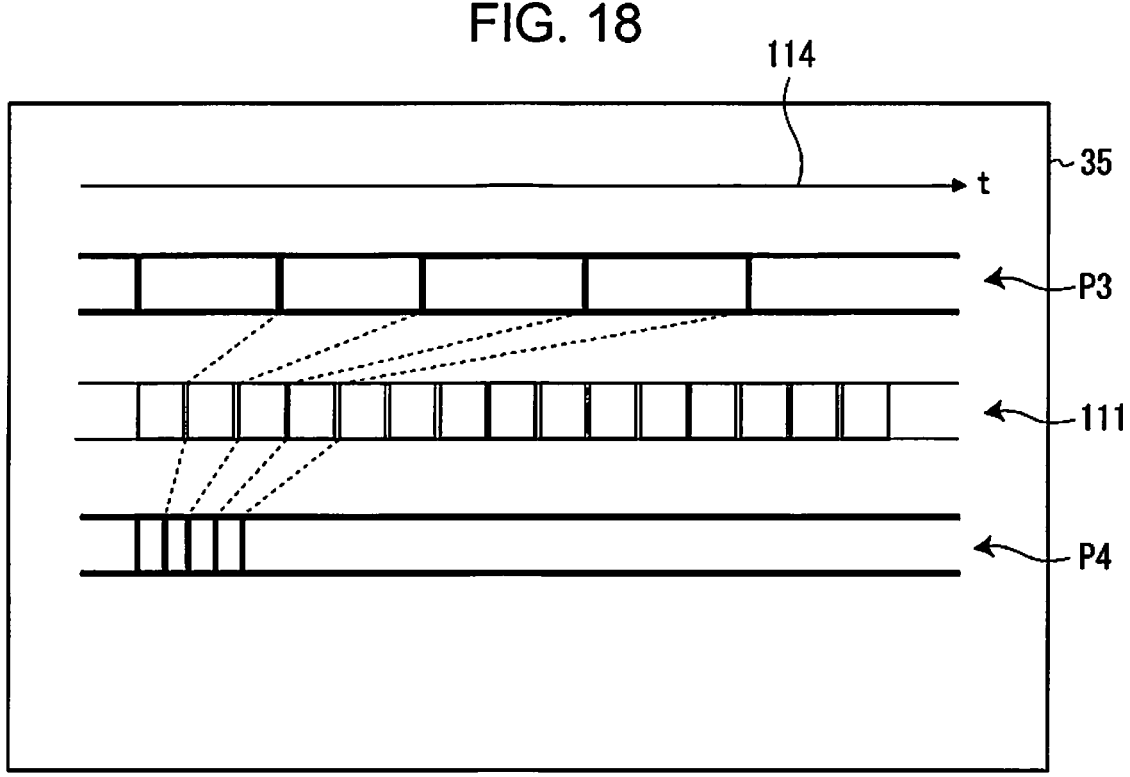
FIG. 18 illustrates a display example of information indicating a speed difference.
Figure 19:
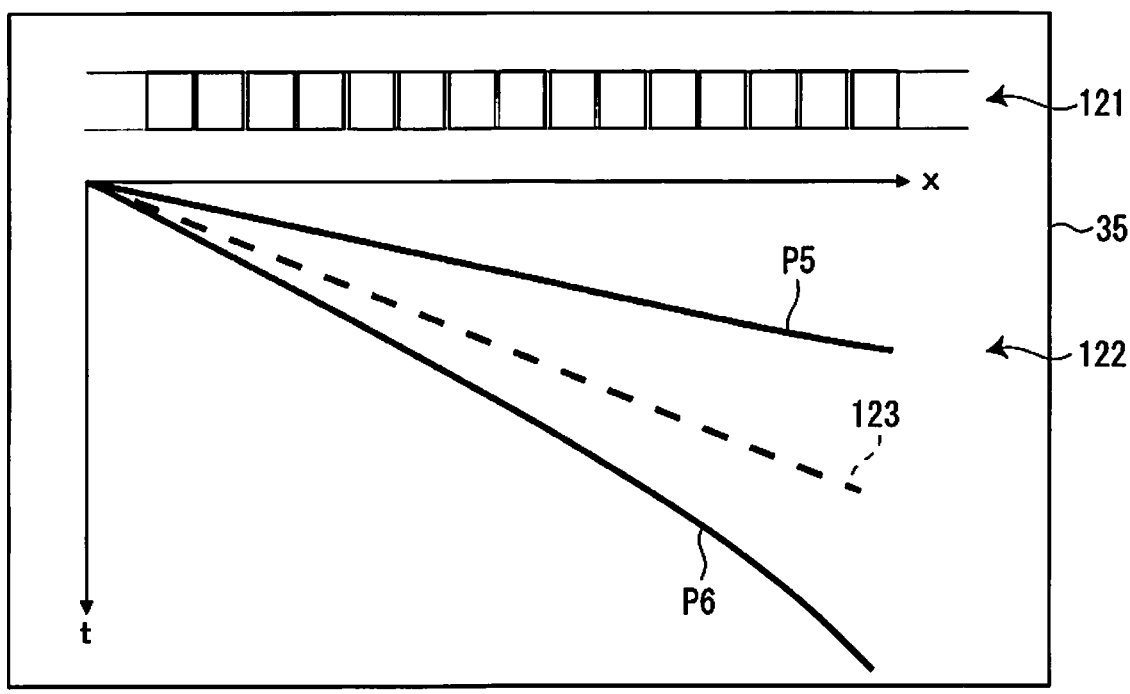
FIG. 19 illustrates a display example of information indicating a speed difference.

In the second embodiment, the composite movie 60 (see FIG. 16) is exemplified as the information indicating the speed difference; however, information other than the composite movie 60 may be displayed. FIGS. 17 to 19 illustrate examples of displaying graphs as information indicating the speed difference.

In the example in FIG. 17, the PC control unit 31 causes the display unit 35 to display a first patch-line image 101 indicating patches for one line, and a first graph 102 in which the horizontal axis represents the position of the colorimeter 2 in the patch-line direction of the first patch-line image 101, that is, the X-axis direction of the color chart 41, and the vertical axis represents the speed. In the first graph 102, a shaded region 103 indicates an ideal speed. In addition, a first solid line P1 indicates an example of the actual speed when the moving speed of the colorimeter 2 is faster than the ideal speed. In addition, a second solid line P2 indicates an example of the actual speed when the moving speed of the colorimeter 2 is slower than the ideal speed. The PC control unit 31 plots the first solid line P1 and the second solid line P2 in the first graph 102 when the actual speed is acquired. That is, the first solid line P1 and the second solid line P2 are not plotted when color measurement is ended; but the first solid line P1 and the second solid line P2 extend in real time during color measurement. This is also applied to FIGS. 18 and 19.

When the first graph 102 is actually plotted, not both the first solid line P1 and the second solid line P2 are plotted; however, FIG. 17 plots both the first and second solid lines P1 and P2 for the convenience of explanation. This is also applied to FIGS. 18 and 19.

In the example in FIG. 18, the PC control unit 31 causes the display unit 35 to display a second patch-line image 111 indicating patches for one line, and a time axis 114 provided along the patch-line direction of the second patch-line image 111. The second patch-line image 111 indicates a reading time for each patch when the colorimeter 2 is moved at the ideal speed. In addition, a third patch image P3 indicates an example of a reading time for each patch when the moving speed of the colorimeter 2 is slower than the ideal speed. That is, the third patch image P3 indicates that it takes more time for reading one patch as compared with the situation in which the colorimeter 2 is moved at the ideal speed. In contrast, a fourth patch image P4 indicates a reading time for each patch when the moving speed of the colorimeter 2 is faster than the ideal speed. The PC control unit 31 plots the third patch image P3 and the fourth patch image P4 when the actual speed is acquired.

In the example in FIG. 19, the PC control unit 31 causes the display unit 35 to display a third patch-line image 121 indicating patches for one line, and a second graph 122 in which the horizontal axis represents the moving distance of the colorimeter 2 in the patch-line direction of the third patch-line image 121, that is, the X-axis direction of the color chart 41, and the vertical axis represents the time. In the second graph 122, a second broken line 123 indicates an ideal speed. In addition, a fifth solid line P5 indicates an example of the actual speed when the moving speed of the colorimeter 2 is faster than the ideal speed. In addition, a sixth solid line P6 indicates an example of the actual speed when the moving speed of the colorimeter 2 is slower than the ideal speed. The PC control unit 31 plots the fifth solid line P5 and the sixth solid line P6 in the second graph 122 when the actual speed is acquired.

Modification 2-3

Figure 20:
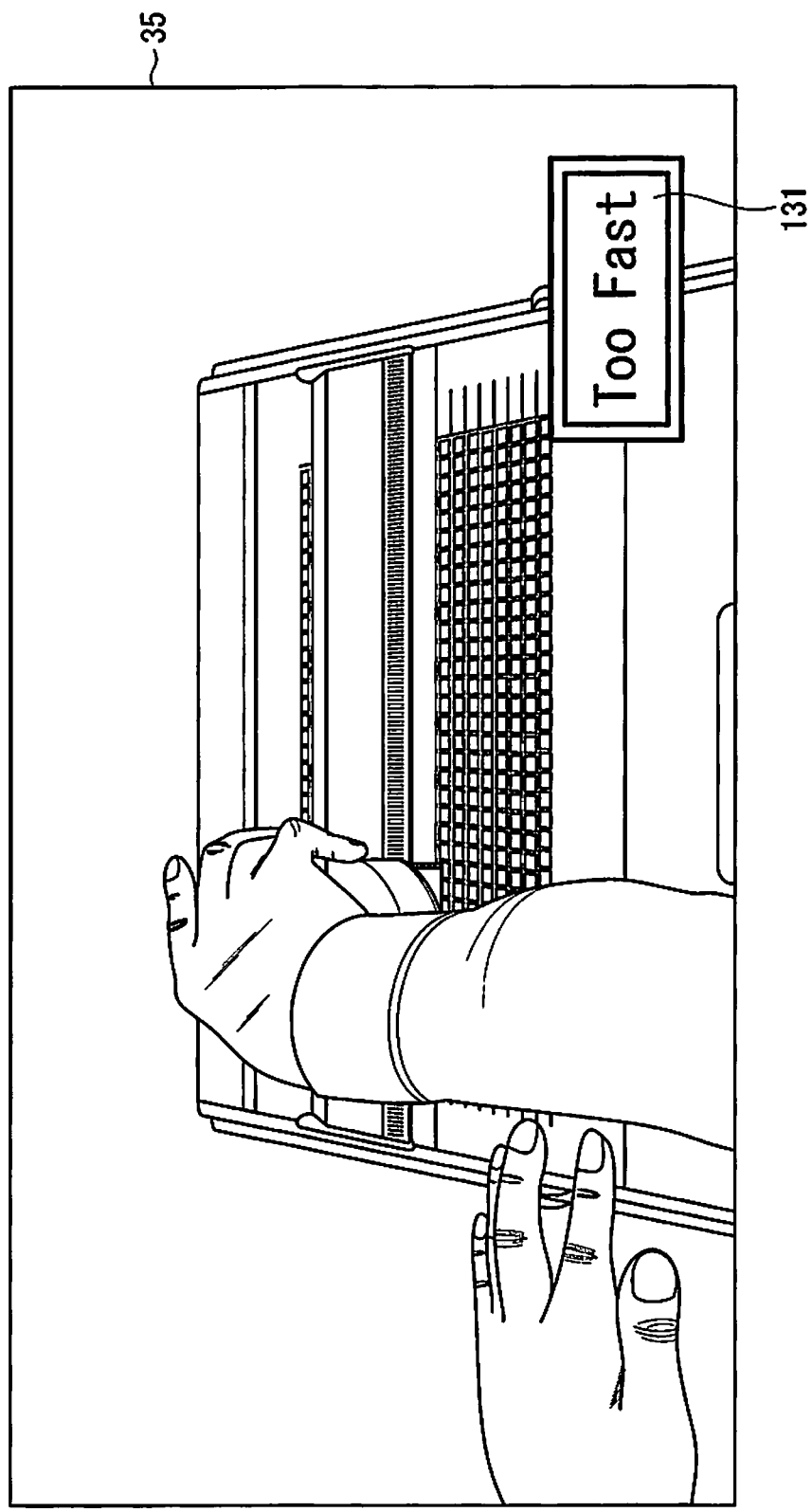
FIG. 20 illustrates a display example of information indicating a speed difference.

In addition, for the information indicating the speed difference, different characters may be displayed in accordance with the difference between the actual speed and the ideal speed alternatively to the composite movie 60 and the graph. FIG. 20 illustrates an example of displaying character information 131 as information indicating the speed difference. In this example, the PC control unit 31 causes the display unit 35 to display the character information 131 together with the captured movie of the camera 6. The character information 131 in FIG. 20 is characters "Too Fast", indicating that the actual speed is faster than the ideal speed.

Figure 21:
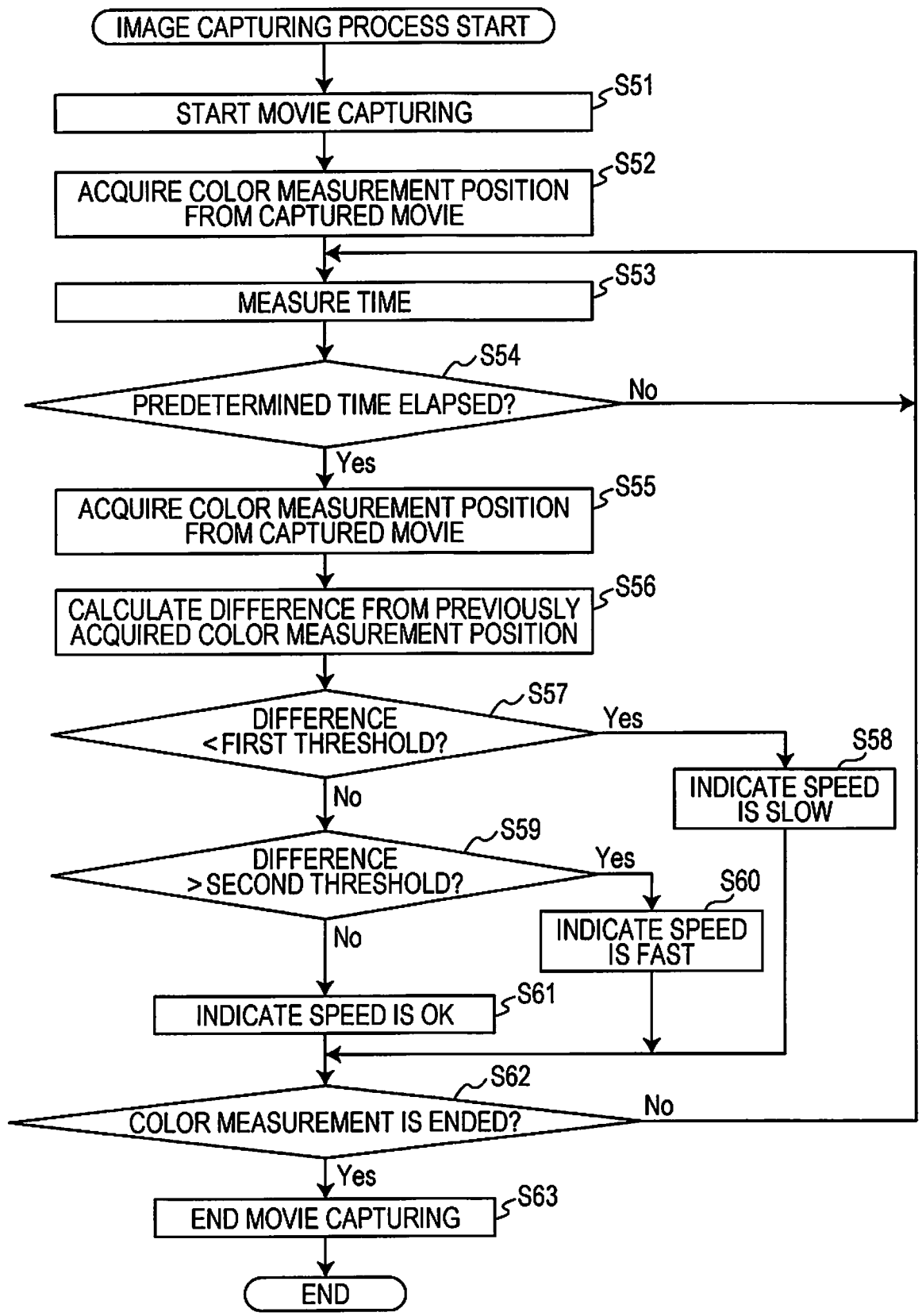
FIG. 21 is a flowchart illustrating an image capturing process.

FIG. 21 is a flowchart indicating an image capturing process for implementing the display illustrated in FIG. 20. The image capturing process in FIG. 21 is a process that is executed while the color measurement process corresponding to step S12 in FIG. 13 is performed. The PC control unit 31 starts capturing a movie by using the camera 6 (S51) when the color measurement process is started, and acquires a color measurement position from the captured movie (S52). The PC control unit 31 measures the time (S53), determines whether a predetermined time has elapsed or not (S54), and when determining that the predetermined time has not elapsed (S54: No), returns to step S53. When determining that the predetermined time has elapsed (S54: Yes), the PC control unit 31 acquires the color measurement position from the captured movie (S55), and calculates the difference from the previously acquired color measurement position (S56). The difference from the previously acquired color measurement position corresponds to the moving distance of the colorimeter 2 within the predetermined time.

The PC control unit 31 determines whether the calculated difference in the color measurement position is smaller than a first threshold or not (S57), and when determining that the difference in the color measurement position is smaller than the first threshold (S57: Yes), displays the character information 131 indicating the situation that the actual speed is slower than the ideal speed (S58), and goes to S62. In addition, the PC control unit 31 determines whether the calculated difference in the color measurement position is larger than a second threshold or not, the second threshold being larger than the first threshold (S59), and when determining that the difference in the color measurement position is larger than the second threshold (S59: Yes), displays the character information 131 indicating the situation that the actual speed is faster than the ideal speed (S60), and goes to S62.

When determining that the difference in the color measurement position is smaller than the second threshold (S59: No), the PC control unit 31 displays the character information 131 indicating the situation in which the actual speed is proper (S61). Then, the PC control unit 31 determines whether color measurement has been ended for all patches included in the color chart 41 or not (S62). When determining that the color measurement has not been ended (S62: No), the PC control unit 31 returns to step S53. When determining that the color measurement has been ended for all patches included in the color chart 41 (S62: Yes), the PC control unit 31 ends the movie capturing (S63), and ends the movie capturing process.

Modification 2-4

Figure 22:
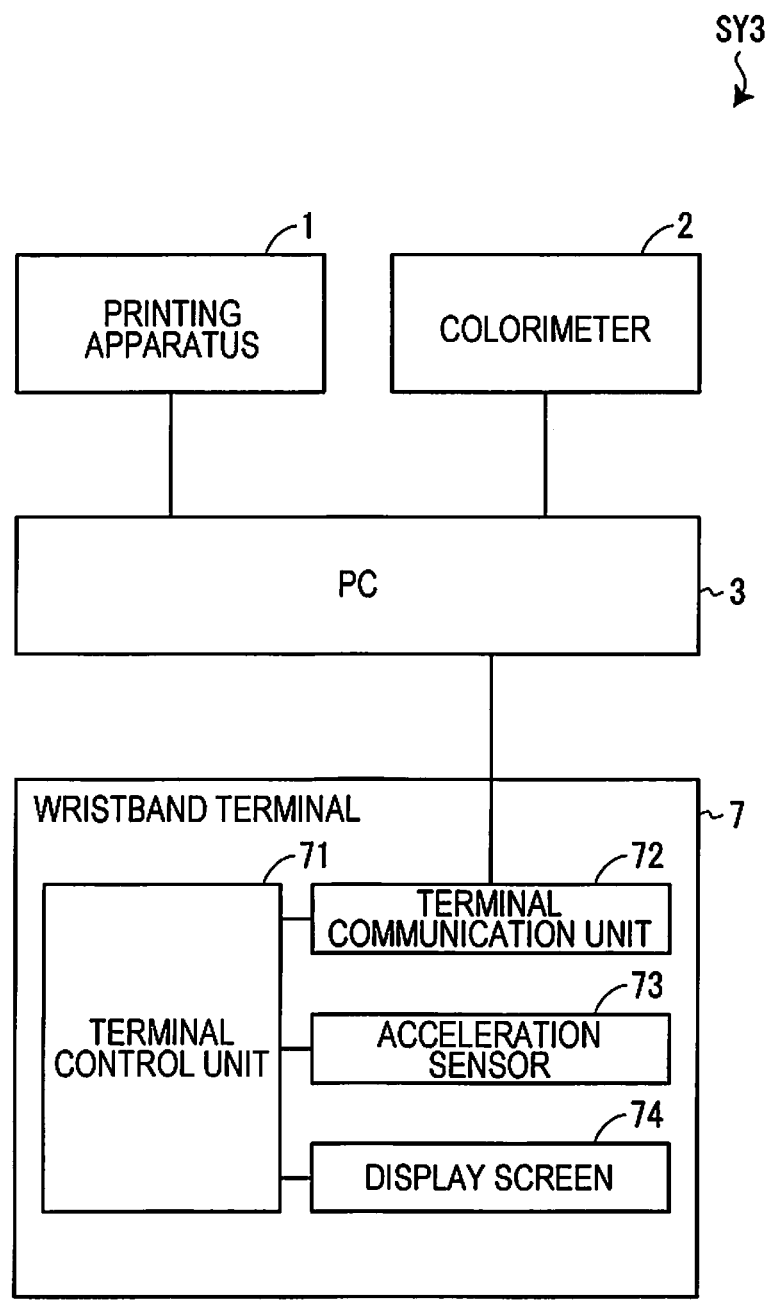
FIG. 22 is a system configuration diagram of a third printing system.

In the second embodiment, the moving speed of the colorimeter 2 is measured from the captured movie of the camera 6; however, measurement may be performed by using another method. FIG. 22 is a system configuration diagram of a third printing system SY3 that measures the moving speed of the colorimeter 2 by using a wristband terminal 7. The third printing system SY3 includes a printing apparatus 1, a colorimeter 2, a PC 3, and the wristband terminal 7. Control systems of the printing apparatus 1, the colorimeter 2, and the PC 3 are similar to those of the first embodiment. In this example, the wristband terminal 7 is used as not only for measuring the moving speed of the colorimeter 2, but also as a display unit for displaying the information indicating the speed difference.

Figure 23:
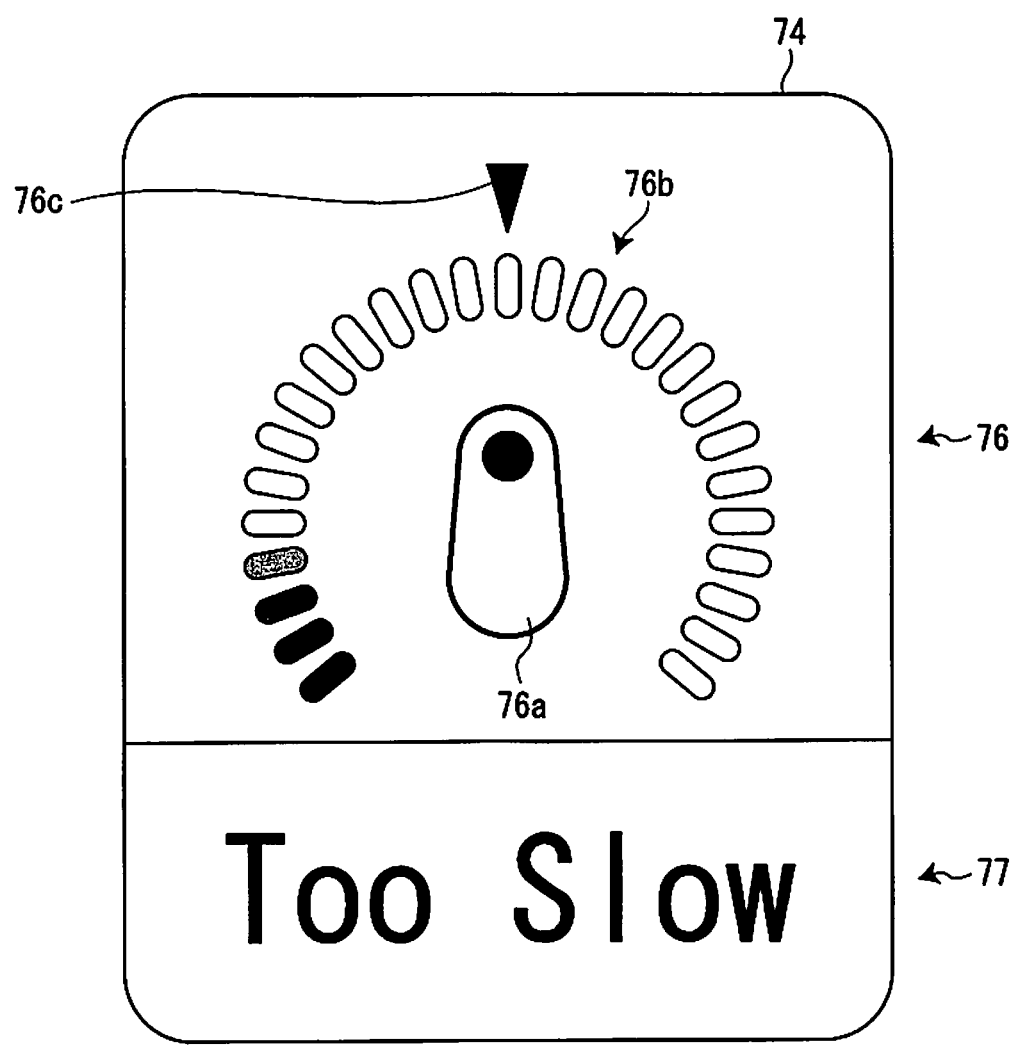
FIG. 23 illustrates a display example of information indicating a speed difference.

The wristband terminal 7 includes a terminal control unit 71, a terminal communication unit 72, an acceleration sensor 73, and a display screen 74. The display screen 74 is an example of "a presenting unit". The acceleration sensor 73 detects a change in acceleration by movement of the wrist of the user who moves the colorimeter 2. The terminal control unit 71 measures the moving speed of the colorimeter 2 based on the detection result of the acceleration sensor 73, measures the moving speed of the colorimeter 2, and transmits the measured moving speed to the PC 3. The PC3 generates information indicating a speed difference based on the moving speed transmitted from the wristband terminal 7, and transmits the generated information to the wristband terminal 7. In this embodiment, display data for displaying the information illustrated in FIG. 23 is transmitted as the information indicating the speed difference. The terminal control unit 71 causes the display screen 74 to display the display data transmitted from the PC 3.

The terminal communication unit 72 communicates with the PC 3. The terminal communication unit 72 desirably communicates with the PC 3 by non-contact communication, such as wireless communication or infrared communication, to improve convenience. The display screen 74 displays the information indicating the speed difference based on the display data transmitted from the PC 3.

In the example in FIG. 23, the display data includes meter display data 76 and character display data 77. The meter display data 76 includes a colorimeter image 76a indicating the colorimeter 2, a meter image 76b provided to surround the colorimeter image 76a, and a center image 76c indicating a substantially center portion of the meter image 76b. The meter image 76b includes a plurality of display elements. Respective colors are assigned to the plurality of display elements so that the hue gradually changes from blue to red. For example, green is assigned to the display element near the center image 76c. In addition, in the meter image 76b, the number of display elements that are turned ON changes in accordance with the difference between the actual speed and the ideal speed of the colorimeter 2.

For example, when the display elements corresponding to colors from blue to blue-green are ON and the other display elements are OFF, the situation indicates that the actual speed is slower than the ideal speed. When the display elements corresponding to colors from blue to green are ON, that is, when about a half of all display elements are ON, the situation indicates that the actual speed is substantially equal to the ideal speed. When the display elements corresponding to colors from blue to red are ON, that is, when a large number of display elements are ON, the situation indicates that the actual speed is faster than the ideal speed.

Meanwhile, when the actual speed is slower than the ideal speed, characters "Too Slow" indicating that situation are displayed as the character display data 77. Although not illustrated, when the actual speed is faster than the ideal speed, characters "Too Fast" indicating that situation are displayed. When the actual speed is substantially equal to the ideal speed, the character display data 77 is not displayed.

In this way, according to this example, the user can recognize the speed difference between the actual speed and the ideal speed with the wristband terminal 7 attached to user's wrist. The user does not have to watch the display unit 35 of the PC 3 and can concentrate on the color measurement work.

As another modification of modification 2-4, a wearable terminal other than the wristband terminal 7 may measure the actual speed. For example, an eyeglass terminal having a camera function installed therein may measure the actual speed. In this case, a display of the eyeglass terminal may present information indicating the time difference. The wearable terminal may only measure the actual speed, and the display unit 35 of the PC 3 may present the information indicating the time difference. The actual speed may be measured by using a motion sensor such as a speed sensor instead of the acceleration sensor 73.

As still another modification of modification 2-4, instead of measuring the actual speed by using the wearable terminal, the wearable terminal may transmit a detection signal of a sensor to the PC 3, and the PC control unit 31 may measure the actual speed based on the detection signal of the sensor transmitted from the wearable terminal.

As yet another modification of modification 2-4, the wristband terminal 7 may generate display data. In this case, the wristband terminal 7 serves as an example of "the computer", and a storage unit (not illustrated) in the wristband terminal 7 stores "the program". That is, the wristband terminal 7 may measure the actual speed, and cause the display screen 74 to display information indicating the speed difference based on the ideal speed previously stored in the storage unit in the wristband terminal 7. As a further modification, the wristband terminal 7 may have the function of the PC 3, and may provide a PC-less configuration. In this case, the wristband terminal 7 has a communication function for communication with the printing apparatus 1 and the colorimeter 2.

As a still further modification of modification 2-4, the colorimeter 2, the PC 3, and the wristband terminal 7 may be constituted of a single information processing terminal such as a smartphone. In this case, the information processing terminal serves as an example of "the computer", and a storage unit (not illustrated) in the information processing terminal stores "the program". Also in this case, the information processing terminal has a communication function for communication with the printing apparatus 1. Also in this case, the information processing terminal performs color measurement by using a camera function installed therein and measures the actual speed by using an acceleration sensor installed therein. Also in this case, the color measurement assist program 37*a* and the print control program 37*b* can be provided as smartphone applications.

Modification 2-5

In each of modification 2-3 and modification 2-4, the presenting unit presents, as the information indicating the speed difference, different characters in accordance with the difference between the actual speed and the ideal speed; however, the presenting unit may present different colors in accordance with the difference between the actual speed and the ideal speed. In this case, a light-emitting unit such as a light-emitting diode (LED) may be used as the presenting unit. Alternatively, the presenting unit may present different sounds in accordance with the difference between the actual speed and the ideal speed. In this case, the presenting unit serves as a sound output unit such as a loudspeaker. As another modification, the presenting unit may present the information indicating the speed difference by using a combination of two or more of the character, color, and sound. In this way, with this example, the difference between the actual speed and the ideal speed can be presented to the user with ease of understanding by using one of the character, color, and sound, or a combination of these.

Modification 2-6

As the information indicating the speed difference, vibration may be generated. For example, a vibrator may vibrate when the difference between the actual speed and the ideal speed increases. The vibrator may be provided at, for example, a wearable terminal, such as the wristband terminal 7 or the eyeglass terminal.

Modification 2-7

As the information indicating the speed difference, the difference between the color measurement time based on the actual speed and the color measurement time based on the ideal speed each required for color measurement for one line of patches of the color chart 41 may be presented. Alternatively, the difference between the color measurement time based on the actual speed and the color measurement time based on the ideal speed each required for forward color measurement or return color measurement on the color chart 41 may be presented.

Third Embodiment

A third embodiment is described next. The third embodiment assists the operation of the user to move the colorimeter 2 with respect to the color chart 41 like the second embodiment. In this embodiment, however, the presenting unit that differs from the display unit 35 presents the information indicating the ideal speed of the colorimeter 2. The points different from the first and second embodiments are mainly described below. In this embodiment, like reference signs are applied to components like those in the first and second embodiments, and the detailed description thereof is omitted. In addition, modifications applied to the components like those in the first and second embodiments are likewise applied to this embodiment.

A system configuration diagram of this embodiment is similar to the first printing system SY1 (see FIG. 1). For control systems of the printing apparatus 1, the colorimeter 2, and the PC 3, configurations similar to those of the first embodiment may be employed.

The PC control unit 31 causes the display unit 35 to display setting relating to color measurement on the color chart 41, and causes a presenting unit that differs from the display unit 35 to present information indicating the ideal speed. The presenting unit in this embodiment is the sound output unit 36.

As described above, the color chart 41 is configured such that a plurality of patches with the same size are equally spaced apart from one another in the X direction. The PC control unit 31 causes the sound output unit 36 to generate, as the information indicating the ideal speed, a notification sound every predetermined time that is an ideal time for color measurement on a predetermined number of patches. For example, when the ideal time for measurement on four patches arranged in the X direction is two seconds, the PC control unit 31 generates a notification sound every two seconds. In addition, an image indicating a row of patches at which a notification sound is generated every predetermined number of patches in the X direction of the color chart 41 may be printed on the color chart sheet 4.

The PC control unit 31 changes the ideal time for color measurement on a predetermined number of patches, in accordance with the type of colorimeter 2 selected in the color chart setting screen. In this case, "a predetermined number of patches" is a fixed value of patches, for example, four patches. "The predetermined number" is presented to the user through indication in an instruction manual or displaying on the display unit 35. In addition, "the ideal time" is determined based on the ideal speed of the colorimeter 2 stored in the color measurement assist program 37*a*. That is, the PC control unit 31 changes "the ideal time" in accordance with the ideal speed corresponding to the type of the colorimeter 2 selected in the color chart setting screen.

Figure 24:
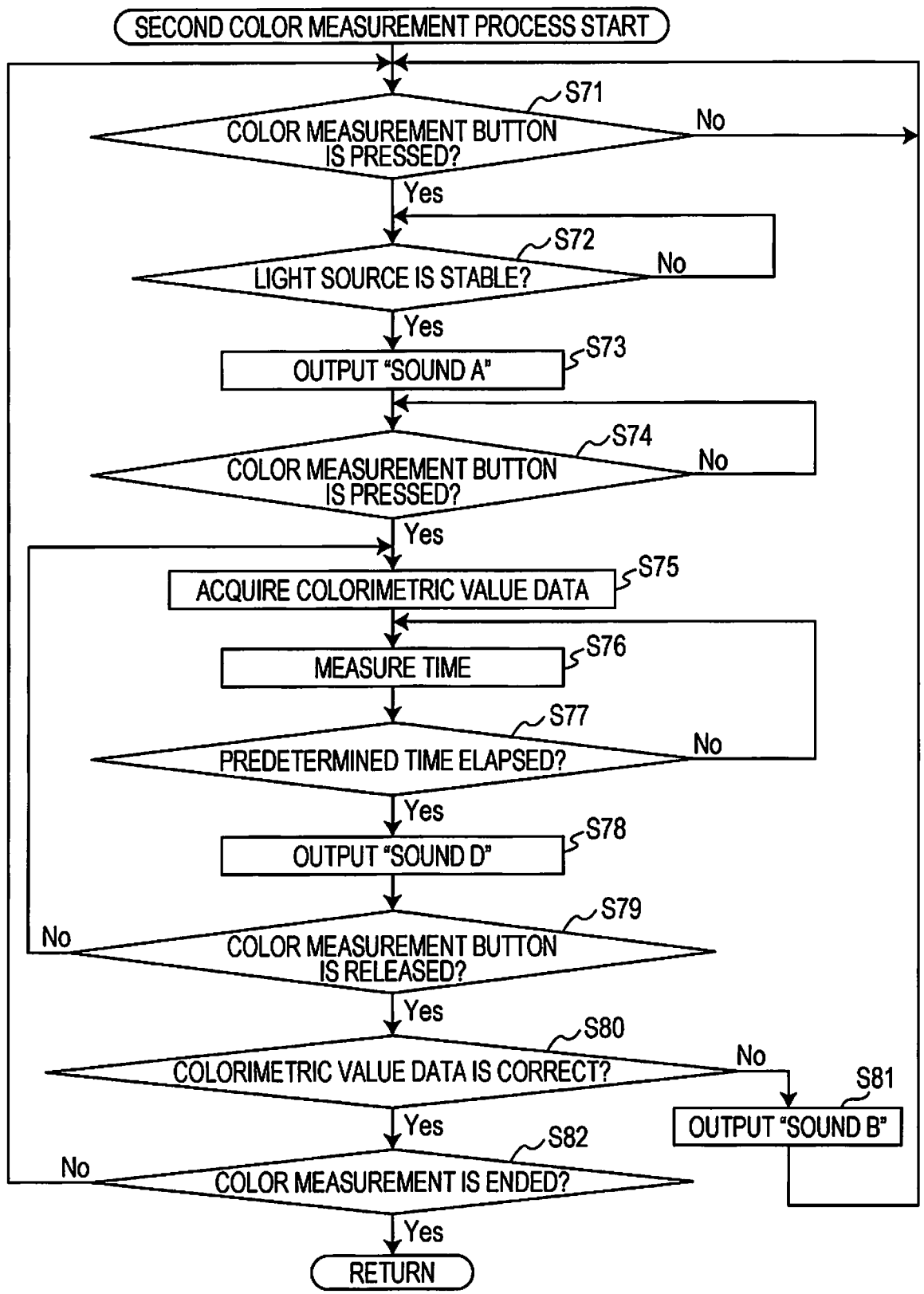
FIG. 24 is a flowchart illustrating a second color measurement process.

FIG. 24 is a flowchart indicating a second color measurement process that is a color measurement process according to the third embodiment. In FIG. 24, steps S71 to S75 are similar to steps S31 to S35 (see FIG. 14) of the first color measurement process, and hence the description thereof is omitted. After the PC control unit 31 starts acquiring colorimetric value data, the PC control unit 31 starts measuring the time (S76), and determines whether a predetermined time has elapsed or not (S77). The predetermined time in step S77 represents the above-described "ideal time".

When determining that the predetermined time has not elapsed since start of time measurement or since previous sound output (see S78) (S77: No), the PC control unit 31 returns to step S76. When determining that the predetermined time has elapsed since start of time measurement or since previous sound output (S77: Yes), the PC control unit 31 outputs "a sound D" by using the sound output unit 36 (S78). "The sound D" is a notification sound for bringing the moving speed of the colorimeter 2 close to the ideal speed, and is a sound different from "the sound A" output in step S73.

The PC control unit 31 determines whether the color measurement button 23 is released or not (S79), and when determining that the color measurement button 23 is not released (S79: No), the PC control unit 31 returns to step S75. In addition, when determining that the color measurement button 23 is released (S79: Yes), the PC control unit 31 determines whether the colorimetric value data acquired while the color measurement button 23 is pressed is correct or not (S80).

When determining that the colorimetric value data is not correct (S80: No), the PC control unit 31 outputs "a sound B" by using the sound output unit 36 (S81). "The sound B" is a sound indicating failure in color measurement, and differs from "the sound A" and "the sound D". When determining that the colorimetric value data is correct (S80: Yes), the PC control unit 31 determines whether color measurement has been ended for all patches included in the color chart 41 (S82). When determining that the color measurement has been ended (S82: Yes), the PC control unit 31 ends the second color measurement process. When determining that the color measurement has not been ended for all patches included in the color chart 41 (S82: No), the PC control unit 31 returns to step S71.

As described above, according to the third embodiment, the PC 3 generates a notification sound every predetermined time that is the ideal time for color measurement on the predetermined number of patches. Thus, the ideal moving speed of the colorimeter 2 can be presented to the user with ease of understanding. Accordingly, the user can perform color measurement on the predetermined number of patches in accordance with the generation of a notification sound, color measurement on the color chart 41 at the ideal and uniform moving speed can be performed. In addition, since the ideal speed is presented by the notification sound, the user can watch the colorimeter 2 and concentrate on the work. Furthermore, since the time interval of generation of the notification sound is changed in accordance with the type of colorimeter 2, the ideal speed suitable for the colorimeter 2 to be used can be presented to the user.

In the third embodiment, the following modifications can be employed.

Modification 3-1

Figure 25:
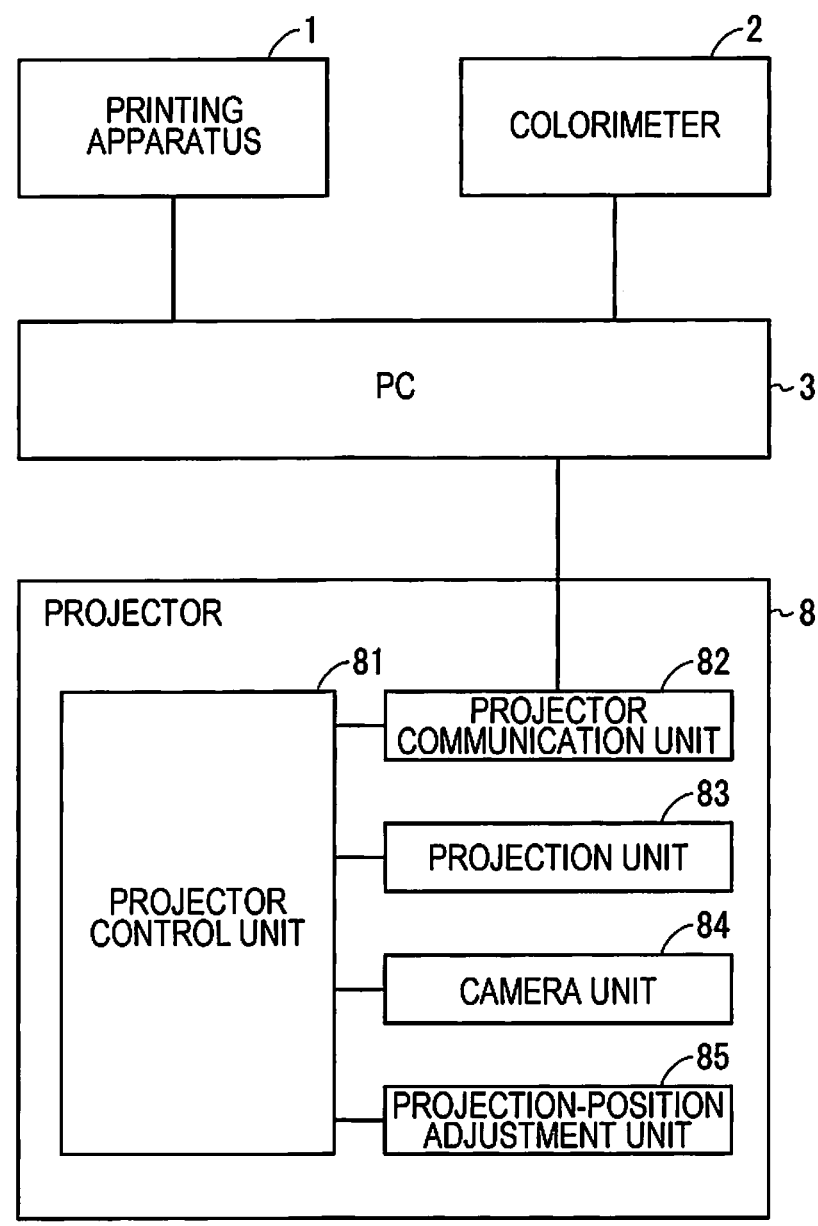
FIG. 25 is a system configuration diagram of a fourth printing system.

In the third embodiment, the sound output unit 36 is used as a unit configured to present the information indicating the ideal speed; however, a projector 8 may be alternatively used. FIG. 25 is a system configuration diagram of a fourth printing system SY4 that is a printing system according to this example. The fourth printing system SY4 includes a printing apparatus 1, a colorimeter 2, a PC 3, and the projector 8. Control systems of the printing apparatus 1, the colorimeter 2, and the PC 3 are similar to those of the first embodiment.

The projector 8 includes a projector control unit 81, a projector communication unit 82, a projection unit 83, a camera unit 84, and a projection-position adjustment unit 85. Although not illustrated, the projection unit 83 and the camera unit 84 are provided at the same surface of the body of the projector 8. In addition, the projection-position adjustment unit 85 provided at a support base that supports the projector 8 can adjust the projection position of the projection unit 83. The projection-position adjustment unit 85 adjusts the direction and inclination of the support base. The projection-position adjustment unit 85 may adjust the projection position by adjusting the direction of a projection lens included in the projection unit 83 in addition to the direction and inclination of the support base.

The PC control unit 31 gives a projection instruction to the projector control unit 81 to project the information indicating the ideal speed. The projector control unit 81 communicates with the PC 3 via the projector communication unit 82, and causes the projection unit 83 to project a movie indicating the ideal speed, based on the projection instruction from the PC control unit 31.

Figure 26:
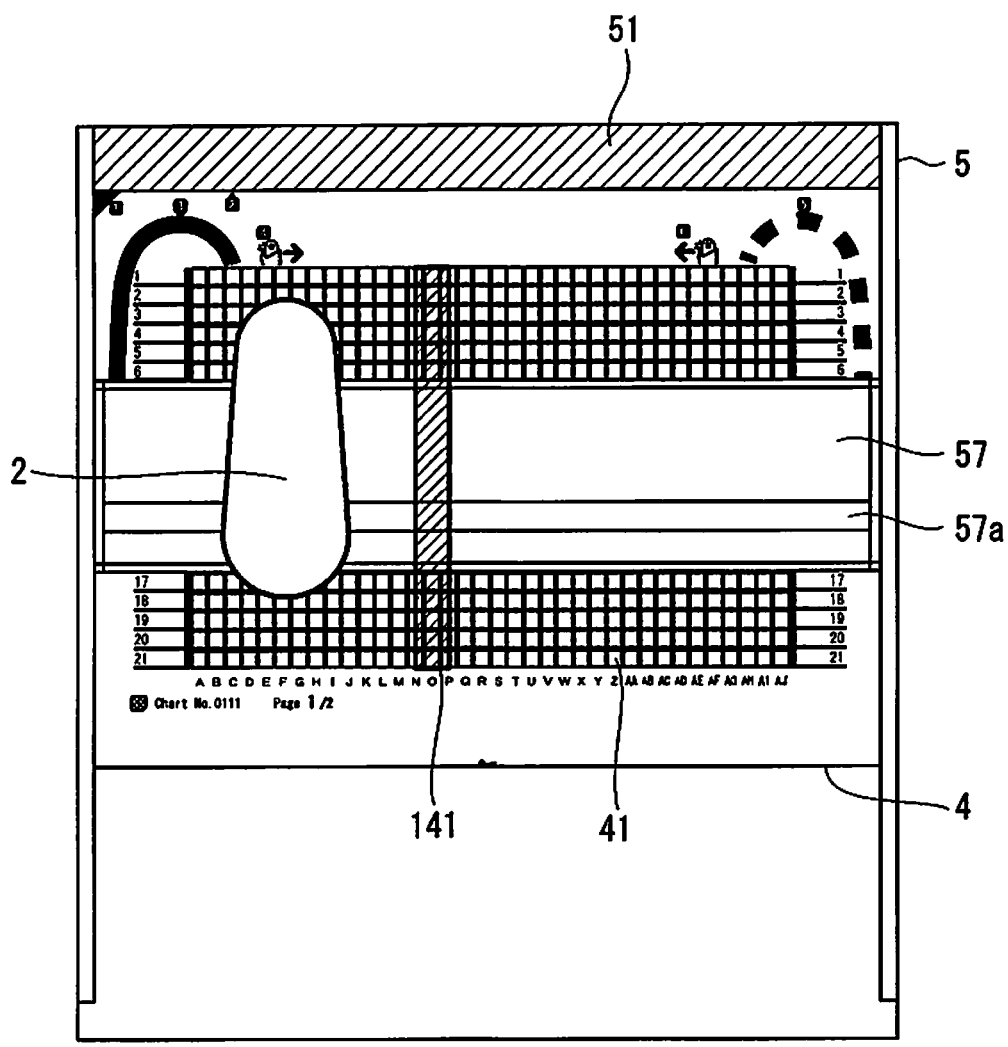
FIG. 26 illustrates a display example of information indicating an ideal speed.

As illustrated in FIG. 26, the projector control unit 81 projects, as the movie indicating the ideal speed, a second line image 141 on the color chart 41. The second line image 141 moves at the ideal speed on the color chart 41. The second line image 141 moves similarly to the first line image 66 (see FIG. 16) described in the second embodiment. In addition, before projection of the movie, the projector control unit 81 turns the camera unit 84 to face the color chart 41, recognizes the position of the color chart 41, and adjusts the projection position by using the projection-position adjustment unit 85.

Since the information indicating the ideal speed is projected on the color chart 41 by using the projector 8 in this embodiment as described above, the user does not have to watch the display unit 35 of the PC 3 and concentrate on the color measurement work.

Modification 3-2

Figure 27:
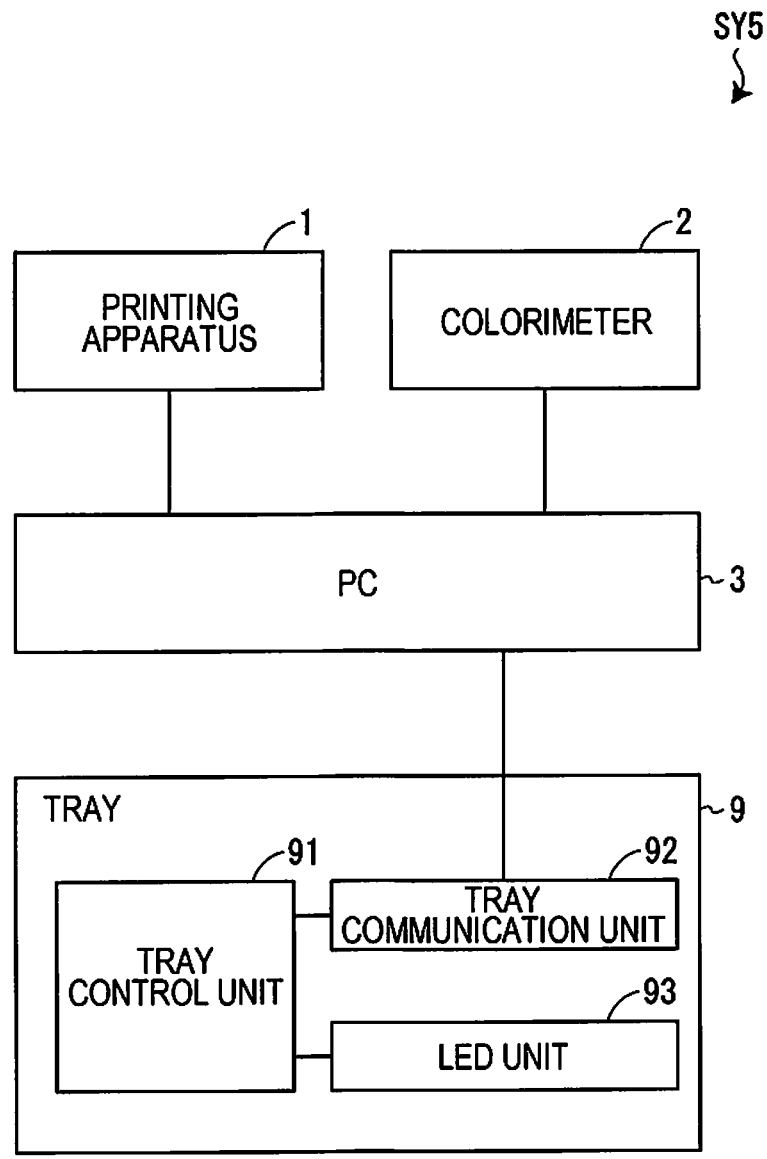
FIG. 27 is a system configuration diagram of a fifth printing system.

As a unit configured to present the information indicating the ideal speed, a tray 9 may be used. FIG. 27 is a system configuration diagram of a fifth printing system SYS that is a printing system according to this example. The fifth printing system SY5 includes a printing apparatus 1, a colorimeter 2, a PC 3, and the tray 9. Control systems of the printing apparatus 1, the colorimeter 2, and the PC 3 are similar to those of the first embodiment.

The tray 9 includes a tray control unit 91, a tray communication unit 92, and an LED unit 93. The appearance of the tray 9 is similar to the tray 5 (see FIG. 7) described in the first embodiment. The PC control unit 31 gives a display instruction to the tray control unit 91 to display the information indicating the ideal speed. The tray control unit 91 communicates with the PC 3 via the tray communication unit 92, and controls driving of the LED unit 93 based on the display instruction from the PC control unit 31. The LED unit 93 is provided at a sheet press clip 51, and includes a plurality of LEDs arranged in the X direction. Instead of the LED unit 93, a display device that displays by other method, such as a liquid crystal display, may be employed.

Figure 28:
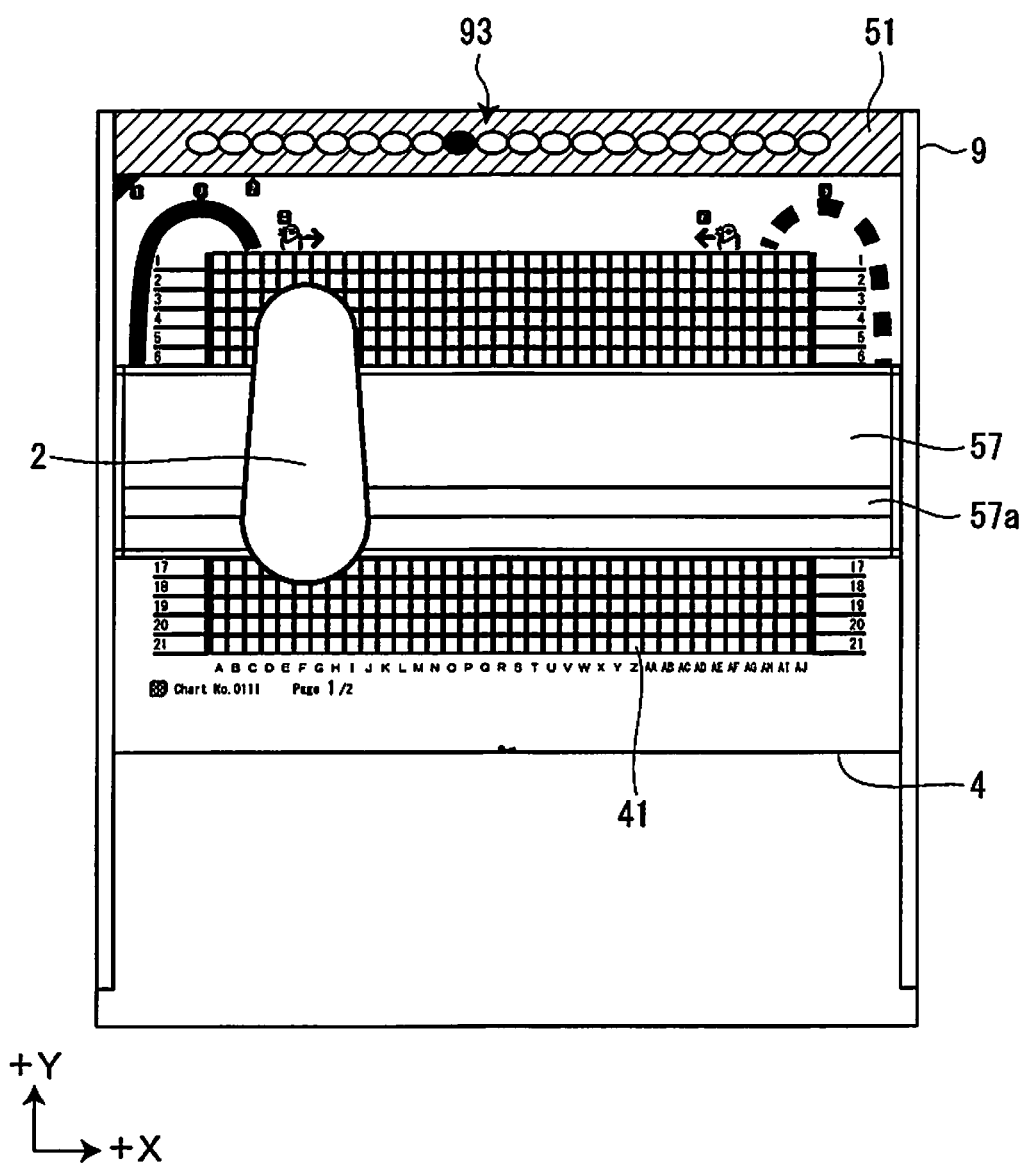
FIG. 28 illustrates a display example of information indicating an ideal speed.

As illustrated in FIG. 28, the tray control unit 91 turns ON one LED of the plurality of LEDs included in the LED unit 93, as the information indicating the ideal speed. The LED to be turned ON is switched in accordance with the ideal speed. That is, the LED to be turned ON is switched in accordance with the position in the X direction of the first line image 66 (see FIG. 16) described in the second embodiment and the second line image 141 (see FIG. 26) described in modification 3-1.

Since the information indicating the ideal speed is presented at the tray 9 in this embodiment as described above, the user does not have to watch the display unit 35 of the PC 3 and concentrate on the color measurement work. In addition, since the tray 9 is for arranging the color chart sheet 4 and the information indicating the ideal speed is presented by using the tray 9, an additional unit for presenting the information indicating the ideal speed is not required.

Modification 3-3

In the third embodiment, the ideal time for color measurement on the predetermined number of patches is changed in accordance with the type of the colorimeter 2 selected in the color chart setting screen. However, when the type of the color chart 41 and the size of patches of the color chart 41 are changeable in the color chart setting screen, the PC control unit 31 may change "the ideal time" in accordance with the above-described setting. In addition, the PC control unit 31 may change the predetermined number of "the predetermined number of patches" instead of "the ideal time" or may change both "the ideal time" and "the predetermined number of patches" in accordance with the type of the colorimeter 2, the type of the color chart 41, and the size of the patches.

Since the time interval of generation of the notification sound is changed in accordance with the type of the color chart 41 and the size of the patches in this example, the ideal speed suitable for the colorimeter 2 to be used can be presented to the user for any type of the color chart 41 and any size of the patches.

Other Modifications

A method of executing each process of the printing system provided in any of the above-described embodiments and modifications, a program for executing each process of the printing system, and a non-transitory computer readable medium that stores the program and is readable by a computer are included in the scope of right. In addition, at least two of the embodiments and modifications may be combined. Further, a change can be properly made within the scope of the disclosure. For example, a plurality of objects provided in any of the above-described embodiments and modifications may be provided as one object, and one object provided in any of the above-described embodiments and modifications may be provided as a plurality of objects. In addition, for example, the colorimeter 2 and the PC 3 may be provided as a single unit. Alternatively, two PCs including a first PC in which the color measurement assist program 37a operates and a second PC in which the print control program 37b operates may provide the function of the above-described PC 3 in cooperation with each other.

Appendices

Appendices of a program and a method of producing a printing system are provided.

A program for assisting an operation of a user to move a colorimeter with respect to a color chart for color measurement is provided. The program causes a computer to function as a control unit that causes a presenting unit to present information indicating a difference between an actual speed and an ideal speed, the actual speed being a moving speed of the colorimeter when the user moves the colorimeter with respect to the color chart, the ideal speed being a moving speed of the colorimeter ideal for color measurement on the color chart.

With this configuration, the presenting unit is caused to present the information indicating the difference between the actual speed and the ideal speed, the actual speed being the moving speed of the colorimeter when the user moves the colorimeter with respect to the color chart, the ideal speed being the moving speed of the colorimeter ideal for the color measurement on the color chart. Thus, whether the moving speed of the colorimeter is faster or slower than the ideal speed can be presented to the user. Accordingly, the user can bring the moving speed of the colorimeter close to the ideal speed, and consequently, the user less likely fail in color measurement. That is, a user inexperienced in color measurement can easily and correctly perform color measurement.

A method of producing a printing system is provided. The printing system includes a printing apparatus that prints a color chart sheet including a color chart for color measurement by a colorimeter that is manually moved, and a control device that controls the colorimeter and the printing apparatus. The method includes printing, by the printing apparatus, the color chart sheet; performing, by the colorimeter, color measurement on the color chart of the color chart sheet; causing, by the control device, a presenting unit to present information indicating a difference between an actual speed and an ideal speed, the actual speed being a moving speed of the colorimeter when a user moves the colorimeter with respect to the color chart, the ideal speed being a moving speed of the colorimeter ideal for color measurement on the color chart; and preforming, by the control device, color adjustment based on a result of the color measurement on the color chart by the colorimeter, and producing the printing system.

With this configuration, a printing system with which a user inexperienced in color measurement can perform printing using proper colors with color adjustment made can be easily produced.

In the program, the control unit may acquire the actual speed based on a captured movie that is a movie in which a state that the user moves the colorimeter is captured.

With this configuration, the actual speed can be acquired by analyzing the captured movie in which the state that the user moves the colorimeter is captured.

In the program, the presenting unit may be a display unit; and the control unit causes the display unit to display, as the information indicating the difference between the actual speed and the ideal speed, a composite movie in which the captured movie and a movie indicating the ideal speed are combined.

With this configuration, the display unit is caused to display the composite movie in which the captured movie and the movie indicating the ideal speed are combined. Thus, the difference between the actual speed and the ideal speed can be presented to the user with ease of understanding. In addition, the captured movie is also used for measuring the actual speed in addition to indicating the actual speed. Thus, a measuring unit for measuring the actual speed is not additionally required.

In the program, the control unit may acquire the actual speed based on a detection result of a sensor that detects a moving speed of the colorimeter that is attached to a body of the user.

With this configuration, since the sensor that detects the moving speed of the colorimeter that is attached to the body of the user is used, an accurate actual speed can be acquired.

In the program, the presenting unit may generate at least one of a character, a color, and a sound; and the control unit may cause the presenting unit to present, as the information indicating the difference between the actual speed and the ideal speed, the at least one of the character, the color, and the sound that varies in accordance with the difference between the actual speed and the ideal speed.

With this configuration, the difference between the actual speed and the ideal speed can be presented to the user with ease of understanding by using one of the character, the color, and the sound.

What is claimed is:

1. A non-transitory computer-readable storage medium storing a program for assisting an operation of a user to move a colorimeter with respect to a color chart for color measurement, wherein the program causes a computer to function as a control unit that causes a presenting unit to present information indicating a difference between an actual speed and an ideal speed, the actual speed being a moving speed of the colorimeter when the user moves the colorimeter with respect to the color chart, the ideal speed being a moving speed of the colorimeter ideal for color measurement on the color chart, and the control unit acquires the actual speed based on a captured movie that is a movie in which a state that the user moves the colorimeter is captured.

2. The storage medium storing the program according to claim 1, wherein the presenting unit is a display unit, and the control unit causes the display unit to display, as the information indicating the difference between the actual speed and the ideal speed, a composite movie in which the captured movie and a movie indicating the ideal speed are combined.

3. A non-transitory computer-readable storage medium storing a program for assisting an operation of a user to move a colorimeter with respect to a color chart for color measurement, the program being operable on a device, wherein the program causes a computer to function as a control unit that causes a presenting unit to present information indicating a difference between an actual speed and an ideal speed, the actual speed being a moving speed of the colorimeter when the user moves the colorimeter with respect to the color chart, the ideal speed being a moving speed of the colorimeter ideal for color measurement on the color chart, and the control unit acquires the actual speed from a different device that is different from the device, based on a detection result of a sensor that detects a moving speed of the colorimeter that is attached to a body of the user.

4. A non-transitory computer-readable storage medium storing a program for assisting an operation of a user to move a colorimeter with respect to a color chart for color measurement, wherein the program causes a computer to function as a control unit that causes a presenting unit to present information indicating a difference between an actual speed and an ideal speed, the actual speed being a moving speed of the colorimeter when the user moves the colorimeter with respect to the color chart, the ideal speed being a moving speed of the colorimeter ideal for color measurement on the color chart, and the presenting unit generates at least one of a character, a color, and a sound, and the control unit causes the presenting unit to present, as the information indicating the difference between the actual speed and the ideal speed, the at least one of the character, the color, and the sound that varies in accordance with the difference between the actual speed and the ideal speed.

5. A method of producing a printing system, the printing system including a printing apparatus that prints a color chart sheet including a color chart for color measurement by a colorimeter that is manually moved and a control device that controls the colorimeter and the printing apparatus, the method comprising:

printing, by the printing apparatus, the color chart sheet;

performing, by the colorimeter, color measurement on the color chart of the color chart sheet;

acquiring, by the control device, an actual speed based on a captured movie that is a movie in which a state that a user moves the colorimeter is captured, the actual speed being a moving speed of the colorimeter when the user moves the colorimeter with respect to the color chart;

causing, by the control device, a presenting unit to present information indicating a difference between the actual speed and an ideal speed, the ideal speed being a moving speed of the colorimeter ideal for color measurement on the color chart; and preforming, by the control device, color adjustment based on a result of the color measurement on the color chart by the colorimeter, and producing the printing system.

6. A method of producing a printing system, the printing system including a printing apparatus that prints a color chart sheet including a color chart for color measurement by a colorimeter that is manually moved and a control device that controls the colorimeter and the printing apparatus, the method comprising:

printing, by the printing apparatus, the color chart sheet;

performing, by the colorimeter, color measurement on the color chart of the color chart sheet;

acquiring, by the control device, an actual speed from a different device that is different from the control device, based on a detection result of a sensor that detects a moving speed of the colorimeter that is attached to a body of a user, the actual speed being a moving speed of the colorimeter when the user moves the colorimeter with respect to the color chart;

causing, by the control device, a presenting unit to present information indicating a difference between the actual speed and an ideal speed, the ideal speed being a moving speed of the colorimeter ideal for color measurement on the color chart; and preforming, by the control device, color adjustment based on a result of the color measurement on the color chart by the colorimeter, and producing the printing system.

7. A method of producing a printing system, the printing system including a printing apparatus that prints a color chart sheet including a color chart for color measurement by a colorimeter that is manually moved and a control device that controls the colorimeter and the printing apparatus, the method comprising:

printing, by the printing apparatus, the color chart sheet;

performing, by the colorimeter, color measurement on the color chart of the color chart sheet;

causing, by the control device, a presenting unit, which generates at least one of a character, a color, and a sound, to present, as information indicating a difference between an actual speed and an ideal speed, the at least one of the character, the color, and the sound that varies in accordance with the difference between the actual speed and the ideal speed, the actual speed being a moving speed of the colorimeter when a user moves the colorimeter with respect to the color chart, the ideal speed being a moving speed of the colorimeter ideal for color measurement on the color chart; and preforming, by the control device, color adjustment based on a result of the color measurement on the color chart by the colorimeter, and producing the printing system.

* * * * *